US010259466B2

(12) United States Patent
Memani et al.

(10) Patent No.: US 10,259,466 B2
(45) Date of Patent: Apr. 16, 2019

(54) SYSTEM FOR MONITORING AND CLASSIFYING VEHICLE OPERATOR BEHAVIOR

(71) Applicant: Depura Partners LLC, Green Bay, WI (US)

(72) Inventors: Shalini Memani, Maharastra (IN); Bhavna Shailendra Depura, Columbus, OH (US); Jamna Lal Depura, West Bengal (IN)

(73) Assignee: DEPURA PARTNERS, LLC, Dublin, OH (US)

( * ) Notice: Subject to any disclaimer, the term of this patent is extended or adjusted under 35 U.S.C. 154(b) by 193 days.

(21) Appl. No.: 14/945,904

(22) Filed: Nov. 19, 2015

(65) Prior Publication Data
US 2017/0144671 A1   May 25, 2017

(51) Int. Cl.
| | |
|---|---|
| *G06Q 40/08* | (2012.01) |
| *B60W 40/09* | (2012.01) |
| *G07C 5/08* | (2006.01) |
| *G07C 5/00* | (2006.01) |
| *G06Q 10/10* | (2012.01) |
| *G06Q 40/00* | (2012.01) |
| *B60W 40/08* | (2012.01) |

(52) U.S. Cl.
CPC ......... *B60W 40/09* (2013.01); *G06Q 10/1053* (2013.01); *G06Q 40/08* (2013.01); *G06Q 40/12* (2013.12); *G07C 5/008* (2013.01); *G07C 5/0841* (2013.01); *B60W 2040/0818* (2013.01); *B60W 2040/0872* (2013.01)

(58) Field of Classification Search
CPC .................................................. G06Q 40/08
See application file for complete search history.

(56) References Cited

U.S. PATENT DOCUMENTS

| | | | |
|---|---|---|---|
| 2012/0123806 A1* | 5/2012 | Schumann, Jr. | ........................... G08G 1/096775 705/4 |
| 2015/0025917 A1* | 1/2015 | Stempora | ............... G06Q 40/08 705/4 |
| 2015/0170289 A1* | 6/2015 | Bowne | ............... G06Q 10/0639 705/4 |

* cited by examiner

*Primary Examiner* — Genna M Mott
(74) *Attorney, Agent, or Firm* — Greer Burns & Crain, Ltd.

(57) ABSTRACT

A system for monitoring operator behavior, motor vehicle behavior, geography and environment, including at least one mobile device and/or at least one personal monitoring system; application software resident on the mobile device for gathering, recording, characterizing, comparing, classifying and communicating information relevant to the motor vehicle operator, the motor vehicle, the geography, and/or the environment, wherein the information is recorded and processed when the operator is operating the motor vehicle and/or not operating the motor vehicle, and wherein the application software is activated or deactivated based on certain predetermined trigger events; at least one central control system in communication with the mobile device and/or the personal monitoring device, wherein the central control system further augments, processes and classifies the information gathered by the application software and communicates the processed and characterized information to a user of the system; at least one algorithm that groups information relevant to the operator, the motor vehicle, the geography, and/or the environment based on quantitative patterns, relationships and interrelationships, wherein the algorithm classifies and provides ranking to the vehicle operator, the motor vehicle, the geography, and/or the environment.

20 Claims, 28 Drawing Sheets

| NAME OF THE SUB-SYSTEM | START TRIGGERS | STOP TRIGGERS | OTHER TRIGGERS |
|---|---|---|---|
| ADMINISTRATIVE CONTROL SUB-SYSTEM | SET-UP COMPLETE<br>LICENSE RENEWED<br>CONNECTION WITH MOBILE DEVICE<br>FORCE START | END OF LICENSE TERM<br>LOCAL DATABASE SIZE<br>BATTERY CHARGE<br>LOSS OF CONNECTION WITH MOBILE DEVICE<br>FORCE STOP | SET-UP COMPLETE |
| DATA COLLECTION SUB-SYSTEM | CHANGE IN LOCATION<br>SPEED<br>TIME<br>HEALTH AND FITNESS LEVEL<br>CHANGE IN MEDICAL CONDITION<br>PRESENCE OF DRUG OR ALCOHOL<br>LIGHT CONDITIONS<br>FORCE START | SPEED<br>TIME<br>ALTITUDE<br>HEALTH AND FITNESS LEVEL<br>CHANGE IN MEDICAL CONDITION<br>PRESENCE OF DRUG OR ALCOHOL<br>LIGHT CONDITIONS<br>FORCE STOP | DEMOGRAPHIC PROFILE<br>AGE<br>GENDER<br>HEIGHT<br>WEIGHT<br>MEDICAL PROFILE AND HISTORY |
| DATA TRANSMISSION SUB-SYSTEM | PRESENCE OF LOCAL DATA<br>PRESENCE OF MOBILE DEVICE<br>FILE SIZE<br>TIME<br>FORCE START | TIME<br>NUMBER OF ATTEMPTS<br>LOSS OF CONNECTION WITH MOBILE DEVICE<br>FORCE STOP | TYPE OF CONNECTIVITY WITH MOBILE DEVICE |

FIG. 6

| Customer Number | Date | Time | Speed | Speed Limit | Zip code | Direction | Use of Cell Phone | Latitude | Longitude | Step count | Active time |
|---|---|---|---|---|---|---|---|---|---|---|---|
| ABC123456789DM | 8/7/2015 | 18:41:01 | 28.1 | 25.0 | 43016 | 280.0 | Idle | 40.11 | -83.16 | 6,500 | 0:22:47 |
| ABC123456789DM | 8/7/2015 | 18:41:03 | 29.6 | 25.0 | 43016 | 279.1 | Idle | 40.11 | -83.16 | 6,500 | 0:22:47 |
| ABC123456789DM | 8/7/2015 | 18:41:04 | 30.8 | 25.0 | 43016 | 279.6 | Idle | 40.11 | -83.16 | 6,500 | 0:22:47 |
| ABC123456789DM | 8/7/2015 | 18:41:34 | 30.4 | 25.0 | 43016 | 341.5 | Idle | 40.11 | -83.16 | 6,500 | 0:22:47 |
| ABC123456789DM | 8/7/2015 | 18:42:25 | 29.3 | 25.0 | 43016 | 40.6 | Idle | 40.12 | -83.16 | 6,500 | 0:22:47 |
| ABC123456789DM | 8/7/2015 | 18:43:10 | 22.6 | 25.0 | 43016 | 264.2 | Idle | 40.12 | -83.16 | 6,500 | 0:22:47 |
| ABC123456789DM | 8/7/2015 | 18:43:21 | 14.6 | 25.0 | 43016 | 8.2 | Idle | 40.12 | -83.16 | 6,500 | 0:22:47 |
| ABC123456789DM | 8/7/2015 | 18:43:22 | 17.1 | 25.0 | 43016 | 11.0 | Idle | 40.12 | -83.16 | 6,500 | 0:22:47 |
| ABC123456789DM | 8/7/2015 | 18:43:24 | 19.4 | 25.0 | 43016 | 5.7 | Idle | 40.12 | -83.16 | 6,500 | 0:22:47 |
| ABC123456789DM | 8/7/2015 | 18:43:27 | 22.3 | 25.0 | 43016 | 355.9 | Idle | 40.12 | -83.16 | 6,500 | 0:22:47 |
| ABC123456789DM | 8/7/2015 | 18:43:37 | 27.0 | 25.0 | 43016 | 316.6 | Idle | 40.12 | -83.16 | 6,500 | 0:22:47 |
| ABC123456789DM | 8/7/2015 | 18:43:42 | 27.0 | 25.0 | 43016 | 316.6 | Telephone Call | 40.12 | -83.16 | 6,500 | 0:22:47 |
| ABC123456789DM | 8/7/2015 | 18:44:12 | 22.8 | 25.0 | 43016 | 352.8 | Telephone Call | 40.11 | -83.16 | 6,500 | 0:22:47 |
| ABC123456789DM | 8/7/2015 | 18:45:03 | 19.2 | 25.0 | 43016 | 337.4 | Telephone Call | 40.11 | -83.16 | 6,500 | 0:22:47 |
| ABC123456789DM | 8/7/2015 | 18:45:08 | 20.9 | 25.0 | 43016 | 335.2 | Telephone Call | 40.11 | -83.16 | 6,500 | 0:22:47 |
| ABC123456789DM | 8/7/2015 | 18:45:13 | 22.1 | 25.0 | 43016 | 340.0 | Telephone Call | 40.11 | -83.16 | 6,500 | 0:22:47 |
| ABC123456789DM | 8/7/2015 | 18:45:18 | 23.4 | 25.0 | 43016 | 344.3 | Telephone Call | 40.11 | -83.16 | 6,500 | 0:22:47 |
| ABC123456789DM | 8/7/2015 | 18:45:23 | 27.0 | 25.0 | 43016 | 351.5 | Telephone Call | 40.11 | -83.16 | 6,500 | 0:22:47 |
| ABC123456789DM | 8/7/2015 | 18:45:29 | 29.0 | 25.0 | 43016 | 353.0 | Telephone Call | 40.11 | -83.16 | 6,500 | 0:22:47 |
| ABC123456789DM | 8/7/2015 | 18:45:34 | 30.3 | 25.0 | 43016 | 354.6 | Telephone Call | 40.11 | -83.16 | 6,500 | 0:22:47 |
| ABC123456789DM | 8/7/2015 | 18:45:44 | 32.1 | 25.0 | 43016 | 355.0 | Telephone Call | 40.11 | -83.16 | 6,500 | 0:22:47 |
| ABC123456789DM | 8/7/2015 | 18:45:49 | 36.1 | 25.0 | 43016 | 359.5 | Telephone Call | 40.11 | -83.16 | 6,500 | 0:22:47 |
| ABC123456789DM | 8/7/2015 | 18:45:59 | 39.1 | 25.0 | 43016 | 6.5 | Telephone Call | 40.11 | -83.16 | 6,500 | 0:22:47 |
| ABC123456789DM | 8/7/2015 | 18:47:10 | 17.0 | 25.0 | 43016 | 309.3 | Telephone Call | 40.11 | -83.16 | 6,500 | 0:22:47 |
| ABC123456789DM | 8/7/2015 | 18:47:16 | 18.8 | 25.0 | 43016 | 306.5 | Telephone Call | 40.11 | -83.16 | 6,500 | 0:22:47 |
| ABC123456789DM | 8/7/2015 | 18:47:21 | 20.1 | 25.0 | 43016 | 307.6 | Telephone Call | 40.11 | -83.16 | 6,500 | 0:22:47 |
| ABC123456789DM | 8/7/2015 | 18:47:26 | 21.4 | 25.0 | 43016 | 301.6 | Telephone Call | 40.11 | -83.16 | 6,500 | 0:22:47 |
| ABC123456789DM | 8/7/2015 | 18:47:31 | 22.8 | 25.0 | 43016 | 295.6 | Telephone Call | 40.11 | -83.16 | 6,500 | 0:22:47 |
| ABC123456789DM | 8/7/2015 | 18:47:36 | 24.6 | 25.0 | 43016 | 290.3 | Telephone Call | 40.11 | -83.16 | 6,500 | 0:22:47 |
| ABC123456789DM | 8/7/2015 | 18:47:46 | 26.0 | 25.0 | 43016 | 284.1 | Telephone Call | 40.11 | -83.16 | 6,500 | 0:22:47 |
| ABC123456789DM | 8/7/2015 | 18:47:52 | 28.1 | 25.0 | 43016 | 280.0 | Telephone Call | 40.11 | -83.16 | 6,500 | 0:22:47 |
| ABC123456789DM | 8/7/2015 | 18:48:02 | 29.6 | 25.0 | 43016 | 279.1 | Idle | 40.11 | -83.16 | 6,500 | 0:22:47 |
| ABC123456789DM | 8/7/2015 | 18:48:02 | 30.8 | 25.0 | 43016 | 279.6 | Idle | 40.11 | -83.16 | 6,500 | 0:22:47 |

FIG. 8A

| Customer Number | Date | Time | Blood Pressure | Blood Glucose | Body Temperature | Heart Rate | Blood Alcohol |
|---|---|---|---|---|---|---|---|
| ABC123456789DM | 8/2/2015 | 0:00:00 | 122/76 | 90 | 98.00 | 68 | 0.00 |
| ABC123456789DM | 8/2/2015 | 2:00:00 | 122/76 | 90 | 97.80 | 64 | 0.00 |
| ABC123456789DM | 8/2/2015 | 4:00:00 | 122/76 | 88 | 97.50 | 62 | 0.00 |
| ABC123456789DM | 8/2/2015 | 6:00:23 | 122/76 | 87 | 97.50 | 84 | 0.00 |
| ABC123456789DM | 8/2/2015 | 8:01:00 | 125/77 | 85 | 98.80 | 78 | 0.00 |
| ABC123456789DM | 8/2/2015 | 10:00:01 | 125/77 | 100 | 99.00 | 71 | 0.00 |
| ABC123456789DM | 8/2/2015 | 12:00:00 | 122/76 | 125 | 99.40 | 72 | 0.00 |
| ABC123456789DM | 8/2/2015 | 14:01:11 | 120/80 | 160 | 99.40 | 72 | 0.00 |
| ABC123456789DM | 8/2/2015 | 16:00:15 | 120/80 | 140 | 99.60 | 71 | 0.01 |
| ABC123456789DM | 8/2/2015 | 18:00:00 | 120/80 | 125 | 99.30 | 71 | 0.02 |
| ABC123456789DM | 8/2/2015 | 20:00:00 | 120/74 | 155 | 98.80 | 74 | 0.02 |
| ABC123456789DM | 8/2/2015 | 22:00:48 | 120/74 | 140 | 98.00 | 73 | 0.01 |
| ABC123456789DM | 8/3/2015 | 0:00:01 | 122/76 | 100 | 97.80 | 69 | 0.00 |
| ABC123456789DM | 8/3/2015 | 2:00:22 | 122/76 | 85 | 97.50 | 63 | 0.00 |
| ABC123456789DM | 8/3/2015 | 4:00:00 | 122/76 | 80 | 97.50 | 60 | 0.00 |
| ABC123456789DM | 8/3/2015 | 6:01:02 | 121/75 | 80 | 98.20 | 82 | 0.00 |
| ABC123456789DM | 8/3/2015 | 8:01:07 | 121/75 | 95 | 98.60 | 77 | 0.00 |
| ABC123456789DM | 8/3/2015 | 10:00:00 | 121/75 | 120 | 99.10 | 72 | 0.00 |
| ABC123456789DM | 8/3/2015 | 12:00:00 | 123/76 | 135 | 99.30 | 72 | 0.00 |
| ABC123456789DM | 8/3/2015 | 14:00:01 | 123/76 | 165 | 99.40 | 71 | 0.00 |
| ABC123456789DM | 8/3/2015 | 16:00:15 | 122/76 | 144 | 99.50 | 73 | 0.00 |
| ABC123456789DM | 8/3/2015 | 18:00:37 | 122/78 | 151 | 99.40 | 74 | 0.00 |
| ABC123456789DM | 8/3/2015 | 20:01:02 | 123/77 | 135 | 98.60 | 74 | 0.00 |
| ABC123456789DM | 8/3/2015 | 22:02:00 | 121/75 | 110 | 98.10 | 73 | 0.00 |
| ABC123456789DM | 8/4/2015 | 0:00:00 | 121/75 | 90 | 97.90 | 68 | 0.00 |
| ABC123456789DM | 8/4/2015 | 2:00:00 | 121/75 | 91 | 97.40 | 62 | 0.00 |
| ABC123456789DM | 8/4/2015 | 4:00:47 | 121/75 | 88 | 97.20 | 60 | 0.00 |
| ABC123456789DM | 8/4/2015 | 6:00:23 | 122/76 | 95 | 98.00 | 81 | 0.00 |
| ABC123456789DM | 8/4/2015 | 8:00:07 | 122/76 | 118 | 98.80 | 75 | 0.00 |
| ABC123456789DM | 8/4/2015 | 10:00:01 | 120/74 | 115 | 99.00 | 72 | 0.00 |
| ABC123456789DM | 8/4/2015 | 12:00:00 | 120/74 | 130 | 99.50 | 71 | 0.00 |
| ABC123456789DM | 8/4/2015 | 14:01:00 | 120/74 | 166 | 99.30 | 73 | 0.00 |
| ABC123456789DM | 8/4/2015 | 16:01:00 | 121/75 | 141 | 99.70 | 72 | 0.00 |
| ABC123456789DM | 8/4/2015 | 18:00:25 | 121/75 | 135 | 99.40 | 74 | 0.03 |
| ABC123456789DM | 8/4/2015 | 20:00:05 | 122/76 | 165 | 98.70 | 75 | 0.01 |
| ABC123456789DM | 8/4/2015 | 22:00:12 | 122/76 | 138 | 98.10 | 74 | 0.00 |

FIG. 8B

| Customer Number | Date | Time | Body Temperature | Awake time | Active time | Walking Steps | Running Steps | Stair Steps | Calories | Miles |
|---|---|---|---|---|---|---|---|---|---|---|
| ABC123456789DM | 8/2/2015 | 0:00:00 | 98.00 | 0:00:00 | 0:00:00 | 0 | 0 | 0 | 0 | 0.0 |
| ABC123456789DM | 8/2/2015 | 2:00:00 | 97.80 | 0:00:00 | 0:00:00 | 0 | 0 | 0 | 0 | 0.0 |
| ABC123456789DM | 8/2/2015 | 4:00:00 | 97.50 | 0:00:00 | 0:00:00 | 0 | 0 | 0 | 0 | 0.0 |
| ABC123456789DM | 8/2/2015 | 6:00:23 | 97.50 | 0:57:32 | 0:32:00 | 4002 | 5115 | 0 | 373 | 4.6 |
| ABC123456789DM | 8/2/2015 | 8:01:00 | 98.80 | 2:57:32 | 0:48:00 | 4280 | 5115 | 2614 | 448 | 6.0 |
| ABC123456789DM | 8/2/2015 | 10:00:01 | 99.00 | 4:57:32 | 0:48:22 | 4301 | 5115 | 2614 | 448 | 6.0 |
| ABC123456789DM | 8/2/2015 | 12:00:00 | 99.40 | 6:57:32 | 0:48:37 | 4345 | 5115 | 2614 | 449 | 6.0 |
| ABC123456789DM | 8/2/2015 | 14:01:11 | 99.40 | 8:57:32 | 0:52:00 | 4680 | 5115 | 2614 | 458 | 6.2 |
| ABC123456789DM | 8/2/2015 | 16:00:15 | 99.60 | 10:57:32 | 0:52:00 | 4695 | 5115 | 2614 | 459 | 6.2 |
| ABC123456789DM | 8/2/2015 | 18:00:00 | 99.30 | 12:57:32 | 1:02:11 | 4842 | 5115 | 2845 | 468 | 6.4 |
| ABC123456789DM | 8/2/2015 | 20:00:00 | 98.80 | 14:38:21 | 1:07:00 | 5078 | 5115 | 2845 | 475 | 6.5 |
| ABC123456789DM | 8/2/2015 | 22:00:48 | 98.00 | 14:38:21 | 1:12:00 | 5402 | 5115 | 2912 | 485 | 6.7 |
| ABC123456789DM | 8/3/2015 | 0:00:01 | 97.80 | 0:00:00 | 0:00:00 | 0 | 0 | 0 | 0 | 0.0 |
| ABC123456789DM | 8/3/2015 | 2:00:22 | 97.50 | 0:00:00 | 0:00:00 | 0 | 0 | 0 | 0 | 0.0 |
| ABC123456789DM | 8/3/2015 | 4:00:00 | 97.50 | 0:00:00 | 0:00:00 | 0 | 0 | 0 | 0 | 0.0 |
| ABC123456789DM | 8/3/2015 | 6:01:02 | 98.20 | 0:36:14 | 0:00:00 | 0 | 0 | 0 | 0 | 0.0 |
| ABC123456789DM | 8/3/2015 | 8:01:07 | 98.60 | 2:36:14 | 0:35:00 | 3800 | 5265 | 2459 | 439 | 5.8 |
| ABC123456789DM | 8/3/2015 | 10:00:00 | 99.10 | 4:36:14 | 0:52:17 | 4412 | 5265 | 2459 | 455 | 6.1 |
| ABC123456789DM | 8/3/2015 | 12:00:00 | 99.30 | 6:36:14 | 0:54:00 | 4526 | 5265 | 2459 | 458 | 6.1 |
| ABC123456789DM | 8/3/2015 | 14:00:01 | 99.40 | 8:36:14 | 1:00:25 | 4701 | 5265 | 2502 | 464 | 6.2 |
| ABC123456789DM | 8/3/2015 | 16:00:15 | 99.50 | 10:36:14 | 1:02:00 | 4786 | 5265 | 2502 | 466 | 6.3 |
| ABC123456789DM | 8/3/2015 | 18:00:37 | 99.40 | 12:36:14 | 1:07:17 | 5214 | 5265 | 2502 | 477 | 6.5 |
| ABC123456789DM | 8/3/2015 | 20:01:02 | 98.60 | 14:27:32 | 1:12:29 | 5589 | 5265 | 2578 | 489 | 6.7 |
| ABC123456789DM | 8/3/2015 | 22:02:00 | 98.10 | 15:02:39 | 1:17:55 | 5644 | 5265 | 2607 | 491 | 6.8 |
| ABC123456789DM | 8/4/2015 | 0:00:00 | 97.90 | 0:00:00 | 0:00:00 | 0 | 0 | 0 | 0 | 0.0 |
| ABC123456789DM | 8/4/2015 | 2:00:00 | 97.40 | 0:00:00 | 0:00:00 | 0 | 0 | 0 | 0 | 0.0 |
| ABC123456789DM | 8/4/2015 | 4:00:47 | 97.20 | 0:00:00 | 0:00:00 | 0 | 0 | 0 | 0 | 0.0 |
| ABC123456789DM | 8/4/2015 | 6:00:23 | 98.00 | 0:41:02 | 0:00:00 | 158 | 0 | 0 | 4 | 0.1 |
| ABC123456789DM | 8/4/2015 | 8:00:07 | 98.80 | 2:41:02 | 0:29:00 | 4865 | 2675 | 2848 | 341 | 5.2 |
| ABC123456789DM | 8/4/2015 | 10:00:01 | 99.00 | 4:41:02 | 0:42:55 | 4925 | 4680 | 2848 | 448 | 6.2 |
| ABC123456789DM | 8/4/2015 | 12:00:00 | 99.50 | 6:41:02 | 0:48:12 | 4865 | 4680 | 2914 | 448 | 6.2 |
| ABC123456789DM | 8/4/2015 | 14:01:00 | 99.30 | 8:41:02 | 0:54:35 | 5412 | 4680 | 3017 | 465 | 6.6 |
| ABC123456789DM | 8/4/2015 | 16:01:00 | 99.70 | 10:41:02 | 0:57:24 | 5489 | 4845 | 3017 | 476 | 6.7 |
| ABC123456789DM | 8/4/2015 | 18:00:25 | 99.40 | 12:41:02 | 1:12:00 | 5674 | 4845 | 3017 | 480 | 6.8 |
| ABC123456789DM | 8/4/2015 | 20:00:05 | 98.70 | 14:41:02 | 1:14:27 | 5715 | 4845 | 3026 | 482 | 6.8 |
| ABC123456789DM | 8/4/2015 | 22:00:12 | 98.10 | 16:55:19 | 1:15:39 | 5802 | 4845 | 3026 | 484 | 6.8 |

FIG. 8C

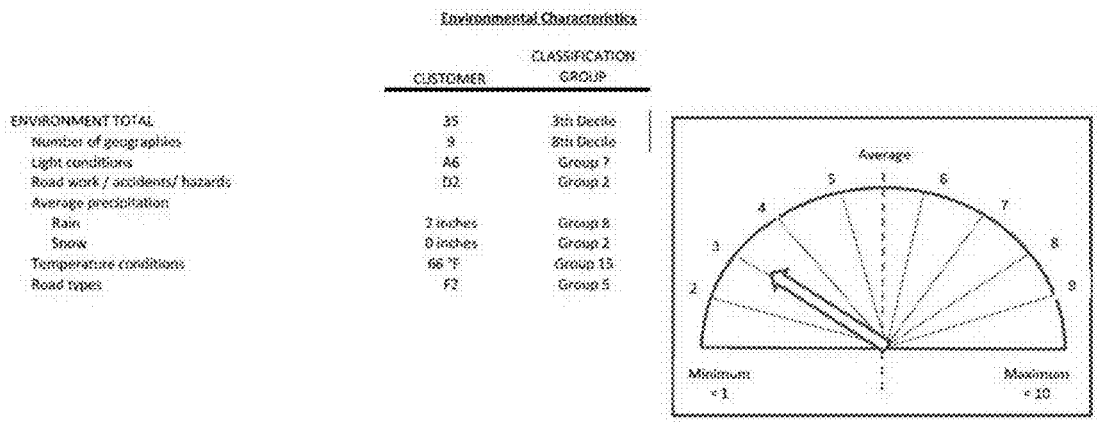

FIG. 11E

REPORT PERIOD
  Start date                    May 1 2015
  End date                      May 31 2015

CUSTOMER NUMBER                 ABC123456789DM

|  | CUSTOMER | CLASSIFICATION GROUP |
|---|---|---|
| EXERCISE | | |
| Average active time | 48 minutes | 6th Decile |
| Days goal achieved | 16 | 8th Decile |
| Average rest / sleep | 7 hours | 9th Decile |
| Body Temperature | 98 °F | 9th Decile |
| Blood Pressure | 122/76 | 7th Decile |
| Heart rate | 71 | 8th Decile |
| Blood glucose level | 126 | 6th Decile |
| Blood alcohol level | 0.002 | 4th Decile |
| Oxygen levels | 97% | 8th Decile |

FIG. 11F

SYSTEM FOR MONITORING AND CLASSIFYING VEHICLE OPERATOR BEHAVIOR

BACKGROUND OF THE INVENTION

The described invention relates in general to systems and methods for monitoring, evaluating and classifying vehicle operator behavior, vehicle behavior, details of geography, details of environment or combinations thereof and more specifically to a system for monitoring, evaluating and classifying vehicle operator behavior, motor vehicle behavior, details of geography, details of environment or combinations thereof using a mobile device such as a cell phone, smartphone or the like; a personal tracking device or a wearable electronic device such as smartwatch, fitness tracker or the like; and classifying the behaviors and details into groups based on quantitative patterns, relationships and interrelationships.

Conventional methods of monitoring the behavior of an operator typically require installation of one or more monitoring devices in the vehicle. Such devices may include an onboard computer and multiple sensors or data readers that plug into an on-board diagnostic port that collect vehicle operation data such as, for example, speed, location, and time of day. As such, these monitoring systems are not designed to be portable and cannot be easily transferred from one vehicle to another. Furthermore, incorrect installation may interfere with the normal and safe operation of the vehicle. Additionally, these monitoring systems may limit the monitoring and recording of data to the operation/function of the motor vehicle itself and may not monitor and record information regarding the operator's own behavior (such as texting or phone usage while driving), which may cause distraction and diminish the operator's ability to safely operate the motor vehicle. Furthermore, the systems are not designed to monitor the operator when the operator is not operating the vehicle or do not take into account lifestyle or health factors (such as sleep deprivation, shaky hands or blood alcohol level) that may further diminish operator's ability to safely operate a motor vehicle. Furthermore, the systems are not designed to collect vehicle location or environment information when it is not being operated by the operator, limiting the comprehensiveness of information collected and are thus not able to predict the likelihood of damage due to events like vandalism, theft or hail-storm, among others. Furthermore, current systems to monitor operator behavior lack efficient mechanism to classify all combinations of the operator behavior, the vehicle behavior, the geographic details and the environment details due to the extremely high computational power required and thus, either do not consider the geography and the environment where the vehicle is operated or consider only specific characteristics of the geographical and the environmental conditions, thereby limiting comprehensiveness of the classification for various combinations of the operator behavior, the vehicle behavior, the geographic details and the environment details. Therefore, there is an ongoing need for a system for monitoring and classifying vehicle operator behavior that is portable; does not require installation in the vehicle; includes information when the operator is operating the vehicle; includes information when the operator is not operating the vehicle; and provides an efficient mechanism to include comprehensive combinations of the operator behavior, the vehicle behavior, the geographic details, the environment details and combinations thereof.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for monitoring and classifying the behavior of motor vehicle operator; the behavior of motor vehicle; the details of geography where the motor vehicle is operated; the details of environment where the motor vehicle is operated; or combinations thereof, is provided. This system includes at least one mobile device such as, for example, a smartphone, a cellular phone, personal digital assistant or the like; wherein the mobile device is not physically installed in the motor vehicle being monitored; wherein the mobile device further includes hardware, software, sensors, and communication functions such as, for example, Global Positioning System (GPS) function, multi axis accelerometer, gyroscope, local memory, compass, battery, calendar and clock; wherein the mobile device further includes at least one information processor resident on the mobile device or in communication with the mobile device; at least one application software resident on the mobile device, wherein the at least one application software interfaces with the hardware, software, sensors, communication functions and the information processor to gather, record, characterize, compare, classify and communicate information about the motor vehicle operator, the motor vehicle, the geography, the environment, or combinations thereof; and wherein the at least one application software is activated and deactivated based on certain predetermined trigger events; at least one central control system, wherein the at least one central control system further includes hardware, software, databases, algorithms and communication functions; wherein the database further includes information collected from the at least one mobile device and additional information about the operator, the motor vehicle, the geography, the environment, or combinations thereof; wherein the central control system further includes at least one information processor resident on the central control system; and wherein the at least one central control system is operative to aggregate, augment, characterize, compare, classify and communicate information about the operator, the vehicle, the geography, the environment or combinations thereof; and at least one algorithm that groups information relevant to the individual operator, the motor vehicle, the geography, the environment, or combinations thereof based on quantitative patterns, relationships and interrelationships; wherein the at least one algorithm is operative to classify and provide ranking to the operator, the motor vehicle, the geography, the environment, or combinations thereof; wherein the classification or ranking includes information when the operator is operating the motor vehicle, when the operator is not operating the motor vehicle or combinations thereof.

In accordance with another aspect of the present invention, an alternate system for monitoring and classifying the vehicle operator behavior; the motor vehicle behavior, the geographic details and the environment details comprising: at least one personal monitoring device such as, for example, a smartwatch, a fitness tracker or similar wearable portable electronic device; wherein the personal monitoring device is physically worn, connected or is located in close proximity to the motor vehicle operator; wherein the at least one personal monitoring device includes hardware, software, sensors and communication functions such as, for example, medical, health and fitness sensors, environment sensors, calendar, clock, local memory, battery, and communication functions; wherein the hardware, software, sensors and communication functions included in the at least one personal monitoring device are operative to gather, record, characterize, compare, classify and communicate information about the behavior, health and fitness of the motor vehicle operator and additional information about the vehicle, the geography, the environment or combinations thereof; wherein the at least one personal monitoring device further includes at least one information processor resident on the personal monitoring device or in communication with the personal monitoring device; at least one application software resident on the personal monitoring device, wherein the at least one application software interfaces with the hardware, software, sensors, communication functions and the information processor to gather, record, characterize, compare, classify and communicate information about the motor vehicle operator; the motor vehicle; the geography; the environment; or combinations thereof; and wherein the at least one application software is activated and deactivated based on certain predetermined trigger events; at least one central control system, wherein the at least one central control system further includes hardware, software, databases, algorithms and communication functions; wherein the databases further includes information collected from the at least one personal monitoring device and additional information about the operator, the motor vehicle, the geography, the environment, or combinations thereof; wherein the central control system further includes at least one information processor resident on the central control system; and wherein the at least one central control system is operative to aggregate, augment, characterize, compare, classify and communicate information about the operator, the vehicle, the geography, the environment or combinations thereof; and at least one algorithm that groups information relevant to the individual operator, the motor vehicle, the geography, the environment, or combinations thereof based on quantitative patterns, relationships and interrelationships; wherein the algorithm is operative to classify and provide ranking to the operator, the motor vehicle, the geography, the environment, or combinations thereof; wherein the classification or ranking includes information when the operator is operating the motor vehicle, when the operator is not operating the motor vehicle or combinations thereof.

In accordance with another aspect of the present invention, an alternate system for monitoring and classifying the vehicle operator behavior; the motor vehicle, the geography and the environment comprising: at least one mobile device such as, for example, a cellular phone, a smartphone, personal digital assistant or the like; wherein the mobile device is not physically connected to the motor vehicle being monitored; wherein the mobile device includes hardware, software, sensors, and communication functions such as, for example, Global Positioning System (GPS) function, multi-axis accelerometer, gyroscope, local memory, compass, battery, calendar and clock; wherein the hardware, software, sensors, and communication functions included in the mobile device are operative to gather, record, characterize, compare, classify and communicate information about the motor vehicle operator, the motor vehicle, the geography, the environment, or combinations thereof; at least one personal monitoring device such as, for example, a fitness tracker, a smartphone, other wearable electronic device or the like; wherein the at least one personal monitoring device is physically worn, connected or is located in close proximity to the operator of the motor vehicle; wherein the at least one personal monitoring device includes additional hardware, software, sensors and communication functions such as, for example, medical, health and fitness sensors, environment sensors, calendar, clock, local memory, battery and communication functions; wherein the additional hardware, software, sensors and communication functions included in the at least one personal monitoring device are operative to gather, record, characterize, compare, classify and communicate information about the behavior, health and fitness of the motor vehicle operator and additional information about the vehicle, the geography, the environment or combinations thereof; wherein the at least one personal monitoring device is operative independently, in combination with the at least one mobile device, or combinations thereof; least one information processor resident on the mobile device, or in communication with the mobile device; least one information processor resident on the personal monitoring device, or in communication with the personal monitoring device; at least one application software resident on the mobile device, the personal monitoring device or combinations thereof; wherein the at least one application software interfaces with the hardware, software, sensors, communication functions and the information processor to gather, record, characterize, compare, classify and communicate information about the motor vehicle operator; the motor vehicle, the geography, the environment, or combinations thereof; and wherein the at least one application software is activated and deactivated based on certain predetermined trigger events; at least one central control system that includes additional hardware, software, databases, algorithms, and communication functions; wherein the databases further include information collected from the at least one mobile device, the at least one personal monitoring device and additional information about the operator, the motor vehicle, the geography, the environment, or combinations thereof; wherein the central control system further includes at least one information processor resident on the central control system; wherein the at least one central control system is operative to aggregate and augment the data collected from the at least one mobile device, the at least one personal monitoring device or combinations thereof; wherein the additional hardware, software, databases, algorithms and communication functions included in the at least one central control system are operative to gather, record, characterize, compare, classify and communicate information about the operator, the vehicle, the geography, the environment, or combinations thereof.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 6 is a table presenting examples of various trigger events used in the operation of a system for monitoring and classifying vehicle operator behavior of the present invention;

FIG. 7A depicts an embodiment of the present invention wherein the user interface includes a handheld device such as mobile telephone, smartphone, personal digital assistant or the like;

FIG. 8A depicts first sample data transmission file in accordance with a system for monitoring and classifying vehicle operator behavior of the present invention;

FIG. 8B depicts second sample data transmission file in accordance with a system for monitoring and classifying vehicle operator behavior of the present invention;

FIG. 8C depicts third sample data transmission file in accordance with a system for monitoring and classifying vehicle operator behavior of the present invention;

FIG. 11E is a fifth example of a usage summary report in accordance with a system for monitoring and classifying vehicle operator behavior of the present invention;

FIG. 11F is a sixth example of a usage summary report in accordance with a system for monitoring and classifying vehicle operator behavior of the present invention;

DETAILED DESCRIPTION OF THE INVENTION

Figure 1A:
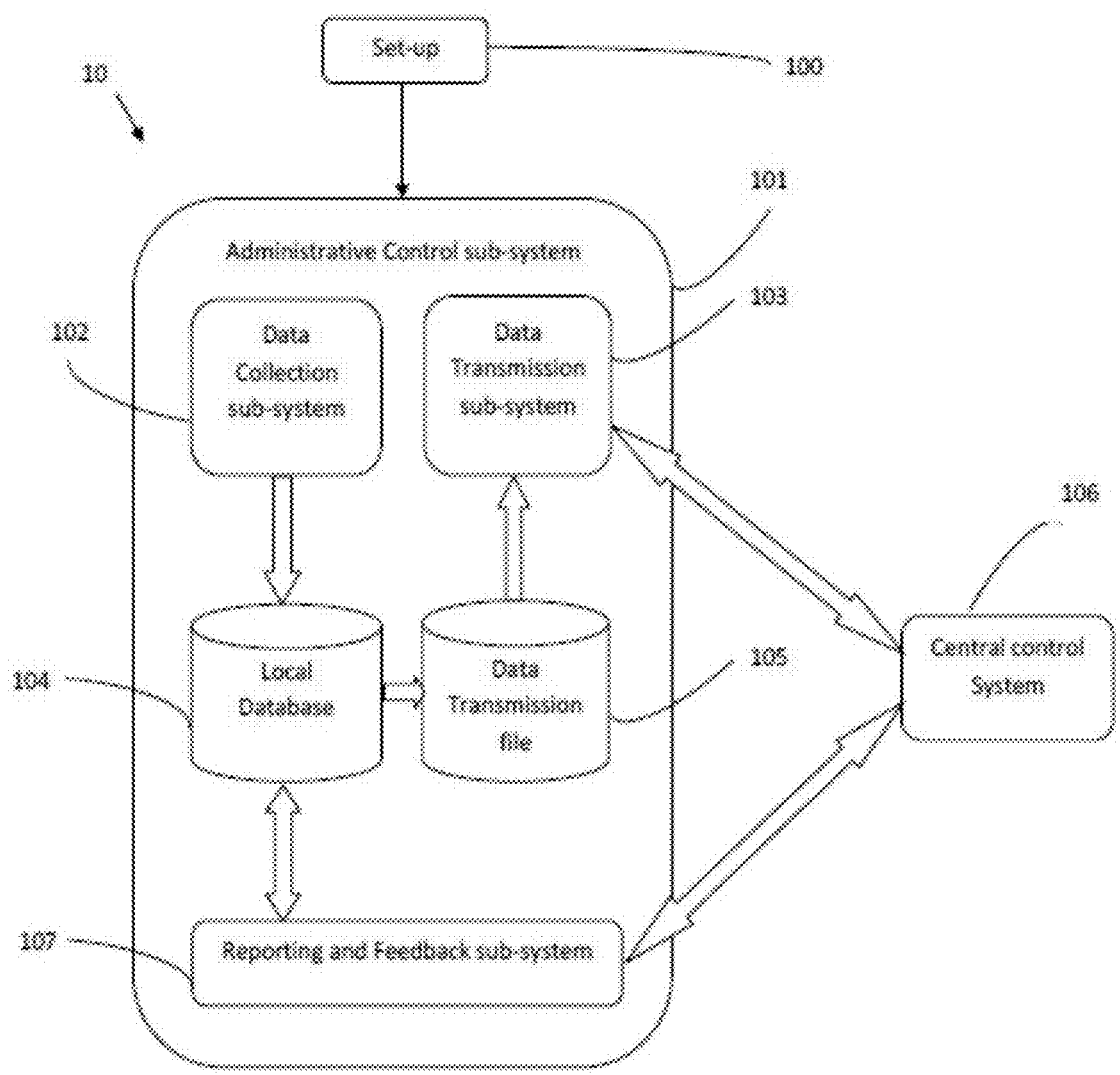
FIG. 1A is a block diagram of an exemplary embodiment of a system for monitoring and classifying vehicle operator behavior of the present invention illustrating the components and subsystems thereof.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to a system for monitoring and classifying the behavior of motor vehicle operator, the behavior of motor vehicle, the details of geography where the motor vehicle is operated, the details of environment where the motor vehicle is operated, and combinations thereof. Relevant data is collected using a mobile device, mobile telephone; smart phone; personable digital assistant; personal or wearable monitoring device (such as smartwatch or fitness tracker); other portable electronic devices; or combinations thereof. Relevant data collection may occur when the vehicle operator is operating the motor vehicle as well as other times when the vehicle operator is not operating the motor vehicle (vehicle is parked); or combinations thereof. The information collected or derived is transmitted to a remote server where the data is recorded, further processed, characterized, compared, classified and communicated to the vehicle operator and/or to another users of the system. The remote server may include additional data from third party sources and data providers. One or more algorithms included in this invention may be used to analyze data gathered by the system and assign classification or rating (or other characterization) to the operator, the vehicle, the geography, the environment or combinations thereof. The classifications or rating may be calculated by grouping behaviors and/or characteristics of the operators, the vehicles, the geographies, the environments or combinations thereof based on quantitative patterns, relationships and interrelationships. Information collected and/or derived may be further used for developing predictive models, decision models and/or descriptive models. Data recorded and/or derived from this invention may be used for purposes such as, for example, determining employability and compensation rate; providing travel and entertainment services; determining the insurability and cost of motor vehicle insurance; determining insurability and cost of health insurance; determining insurability and cost of life insurance; dispatching emergency services; commercial fleet management; route optimization; education; law enforcement; and monitoring and supervising drivers. The present invention gathers useful data from existing mobile devices such as smartphones, personal digital assistants and wearable and personal monitoring devices and does not require hard-wiring a device into a vehicle or other installation procedures, the incorrect execution of which may affect vehicle function or distract the vehicle's operator. Furthermore, the present invention gathers useful information about the health and fitness of the operator; and geography and environment of the operator and vehicle, even when the operator is not operating a motor vehicle. Application software resident on the mobile device and personal monitoring device component of this invention may also be used to independently verify the date and time using a variety of external sources including the central processing system, the mobile device (for personal monitoring device), the personal monitoring device (for mobile device), one or more atomic clocks, cellular service providers, or by other means. With reference now to the Figures, one or more specific embodiments of this invention shall be described in greater detail.

The block diagram provided in FIG. 1A illustrates the components and subsystems of an exemplary embodiment of the present invention. Set-up subsystem 100 is used by the motor vehicle operator to install and configure monitoring system 10. Once the monitoring system 10 is initially configured using the set-up subsystem 100, the monitoring system 10 then operates within the guidance and control of administrative subsystem 101. The administrative subsystem 101 guides and controls the operations of data collection subsystem 102, data transmission subsystem 103, local database 104, data transmission file 105 and reporting and feedback subsystem 107. The data transmission subsystem 103 uses the data transmission file 105 to communicate with central control system 106. The reporting and feedback subsystem 107 may provide reports and feedback to a user of the monitoring system 10 either from the local database 104 or from the central control system 106, or from a combination of both. FIG. 6 is a table presenting examples of various trigger events used by the subsystems of the monitoring system 10. These trigger events may be used to start a subsystem, stop a subsystem or modify the behavior of a subsystem.

Figure 1B:
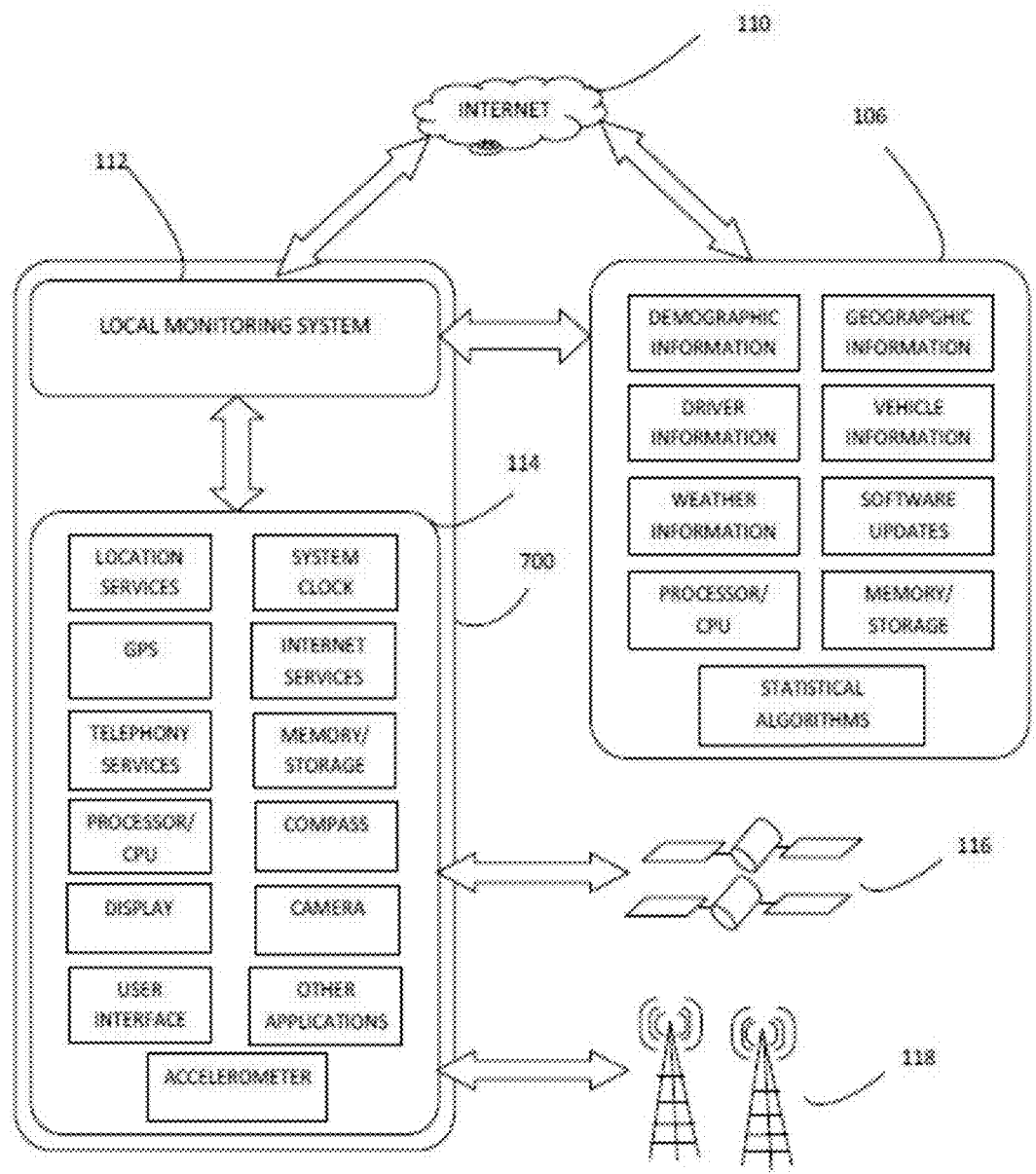
FIG. 1B is a block diagram of an exemplary embodiment of a system for monitoring and classifying vehicle operator behavior of the present invention illustrating the components of the system that are resident on the handheld device, the components that are resident on the central control system and the means by which these components communicate internally and externally.

The block diagram provided in FIG. 1B illustrates some of the components of a system 10 that are resident on handheld mobile device 700, some of the components that are resident on central control system 106 and the means by which these components communicate internally and externally. Local monitoring system 112 receives, processes, and stores information from a variety of local application software, system components, sensors, and/or local hardware available to a mobile device including those shown in FIG. 1B and FIG. 1D (or other components). Mobile device 700 may also communicate with one or more satellites 116 and/or mobile network 118. A central control system 106 typically includes the components shown in FIG. 1B and FIG. 1E (or other components) and communicates with a handheld device 700 by a variety of communication means including one or more cellular networks 118, satellites 116, radio signals, audio signals, electromagnetic signals, thermoelectric signals, Bluetooth, infrared, and/or internet connection 110, among others.

Figure 1C:
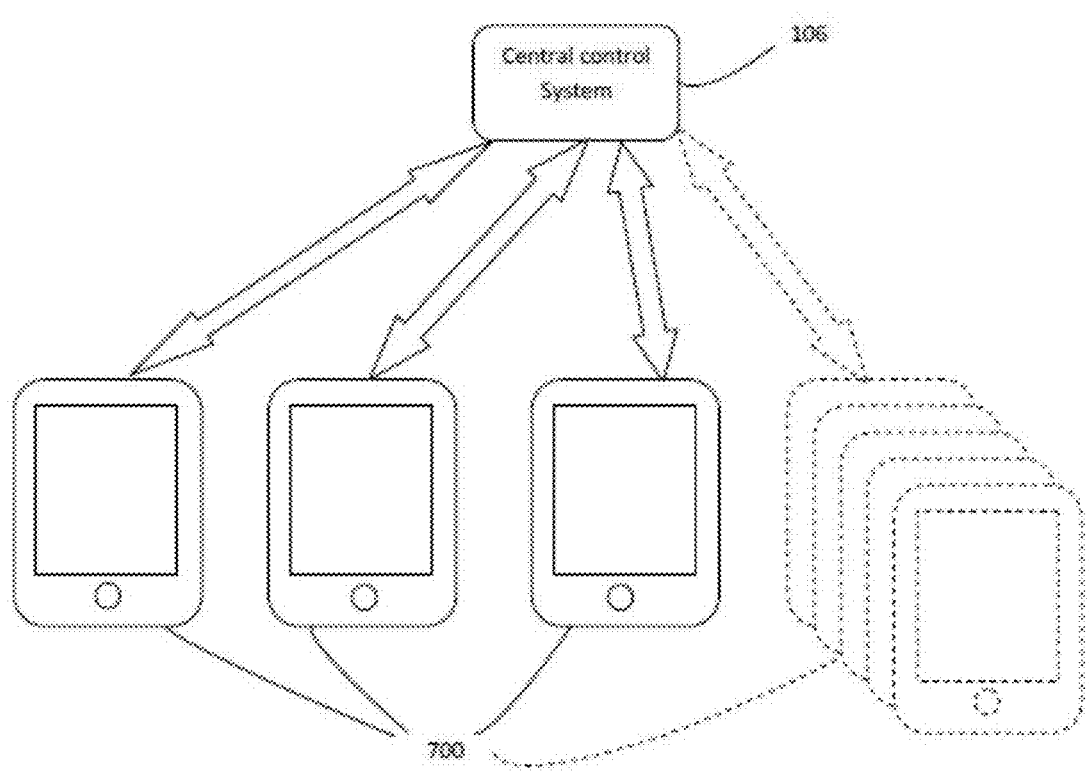
FIG. 1C is a block diagram illustrating that the central control system of the present invention may be in simultaneous communication with a plurality of handheld devices.

The block diagram in FIG. 1C illustrates that a central processing system 106 of the present invention may be in simultaneous communication with a plurality of handheld devices 700 at any given time.

Figure 1D:
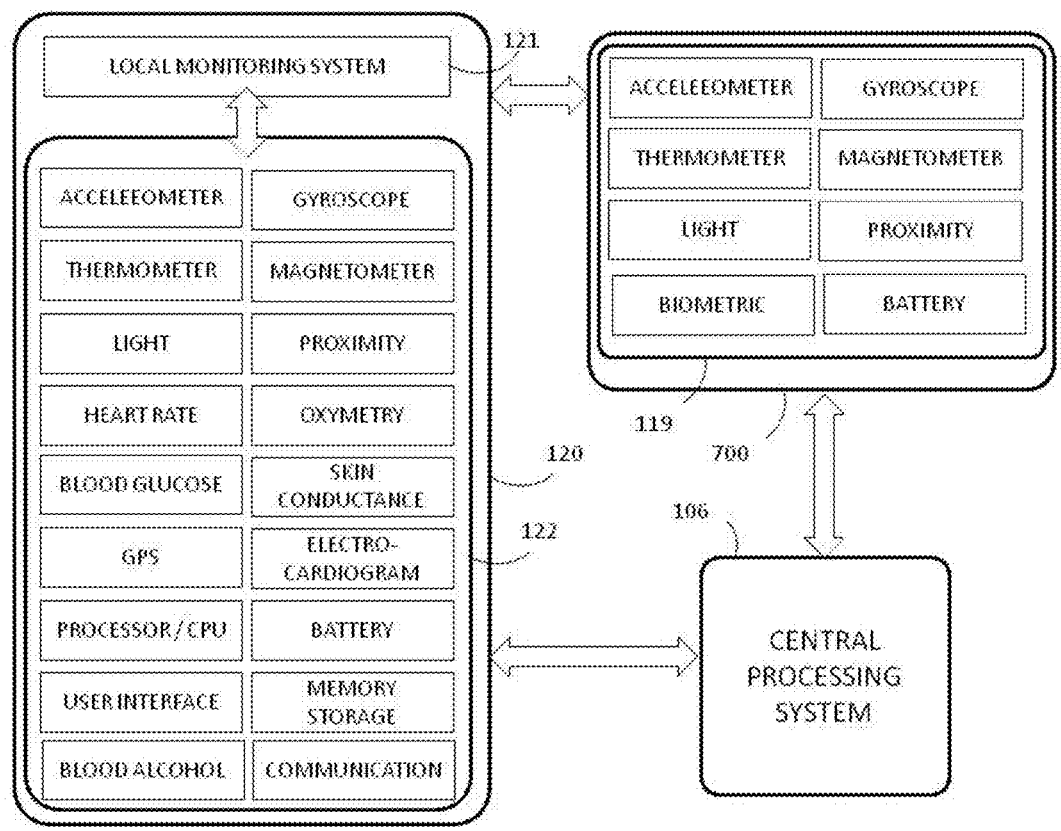
FIG. 1D is a block diagram of an exemplary embodiment of the present invention illustrating the components of system that are resident on the personal monitoring device; additional components resident on the handheld device; central control system; and that these components communicate internally and externally.

The block diagram in FIG. 1D illustrates the components of an exemplary embodiment of the present invention with personal monitoring device 120 such as smartwatch, fitness tracker, blood alcohol monitor or other portable electronic devices popularly known as wearable electronics; components 122 on a personable monitoring device 120; components 119 on mobile device 700 in addition to components already illustrated in FIG. 1B; central processing system 106; and that these components communicate internally and externally. Local monitoring system 121 on the personal monitoring device 120 receives, processes, and stores information from a variety of local application software, system components, and/or local hardware and sensors available to the personal monitoring device including those shown in FIG. 1D (or other components). Personal monitoring device 120 may operate independently or in combination with a handheld mobile device 700 to collect, process, store and communicate information relevant to the behavior and/or characteristics of the operator, the motor vehicle, the geography, the environment or combinations thereof; Personal monitoring device 120 may communicate with a handheld device 700 and/or the central control system 106 by a variety of short range and long range communication means including wired or wireless means such as cellular networks 118, satellites 116, Bluetooth, infrared, radio signals, audio signals, electromagnetic signals, thermoelectric signals, cellular network and/or internet, among others.

Figure 1E:
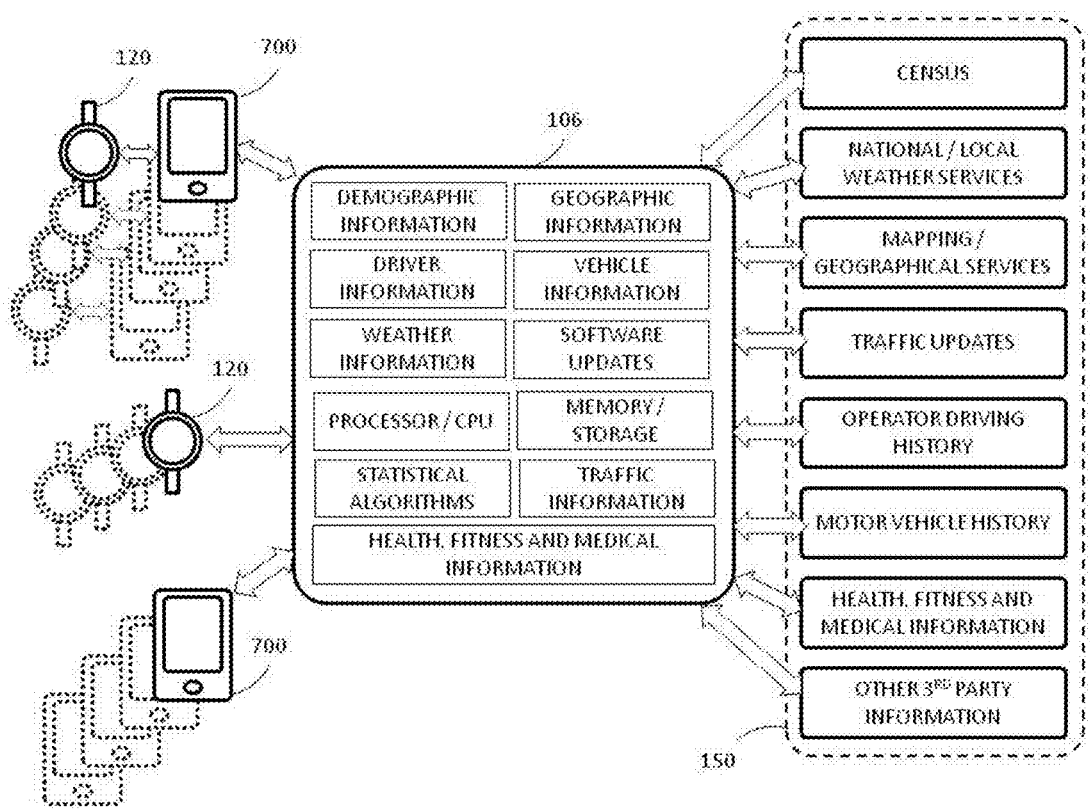
FIG. 1E is a block diagram of an exemplary embodiment of the present invention illustrating the information and components resident on the central control system; wherein a central control system may be in simultaneous communication with plurality of handheld devices, personal monitoring devices, or combinations thereof; wherein some of the information and components resident on a central control system may be updated from a plurality of external information sources.

The block diagram in FIG. 1E illustrates some of the information and components resident on a central control system 106 of an exemplary embodiment of the present invention. FIG. 1E illustrates that the central control system 106 may be in direct or indirect communication with plurality of hand held mobile devices 700; plurality of personal monitoring devices 120; plurality of personal monitoring devices 120 working in combination with mobile devices 700; or combinations thereof. Furthermore, the information resident on the central control system 106 may be updated or synchronized with a number of external information sources 150 including census information; national and local weather information; mapping and geographical information; traffic information; operator background and driving history (from sources like self reporting, law enforcement, department of motor vehicle, insurance companies, employment records, credit bureaus, third party information provider or combinations thereof); motor vehicle history (from sources like department of motor vehicle, vehicle manufacturer, current and prior owners, vehicle repair and service facilities, law enforcement, third party provider or combinations thereof); health and medical records of the operator (from sources like self reporting, national or local databases, medical service providers, medical research facilities, third party providers or combinations thereof); other third party information providers or combinations thereof. Central processing system 106 may communicate with internal and external components and data-sources 150 using a variety of short range and long range communication means including wired or wireless means such as cellular networks 118, satellites 116, Bluetooth, infrared, radio signals, audio signals, electromagnetic signals, thermoelectric signals, cellular network and/or internet, among others.

Figure 2:
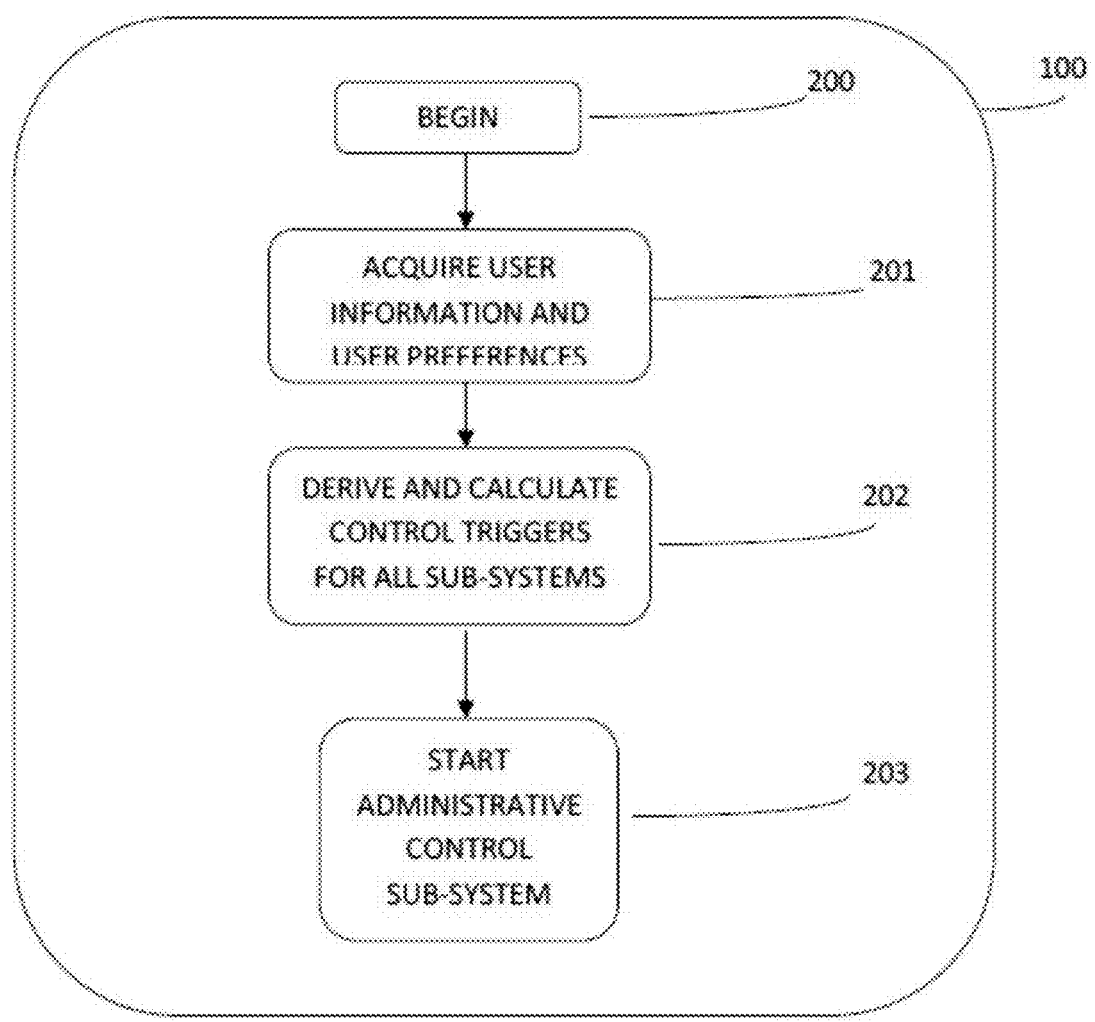
FIG. 2 is a flow chart illustrating the operation of set-up subsystem of a system for monitoring and classifying vehicle operator behavior of the present invention.

The flow chart provided in FIG. 2 illustrates the operations of set-up subsystem 100. Set-up subsystem 100 is initiated at step 200 when a user first starts using the monitoring system 10 and each time the user wishes to re-configure the monitoring system 10 thereafter. At step 201, set-up subsystem 100 acquires information such as, for example, confirmation of software license for use of system 10; date of license grant (initial or renewed); vehicle identification number; vehicle make, vehicle model, vehicle model year, operator driving history, operator health and medical information, operator lifestyle, operator demographic information, among others. The set-up subsystem 100 also acquires user preferences at step 201, which may include auto/manual updates to system software, real-time versus batch data transmission, data transmission preferences, data sharing, display reports, colors and themes, among others. The set-up subsystem 100 may also acquire information about multiple devices connected to the system 10 such as, for example, mobile device, smartwatch, fitness tracker; primary data source, and user preferences regarding their interconnectivity, data sharing, frequency of updates and synchronization. The set-up subsystem 100 may also acquire user preference and permissions about data sharing and data collection in reference with other users of the system 10 such as, for example, current or potential employer, motor insurance companies, health insurance company, life insurance company, travel and entertainment company, law enforcement, among others. At step 202, the set-up subsystem 100 derives and calculates a plurality of control triggers for all of the subsystems of monitoring system 10. At step 203, the set-up subsystem 100 initiates administrative control subsystem 203.

Figure 3A:
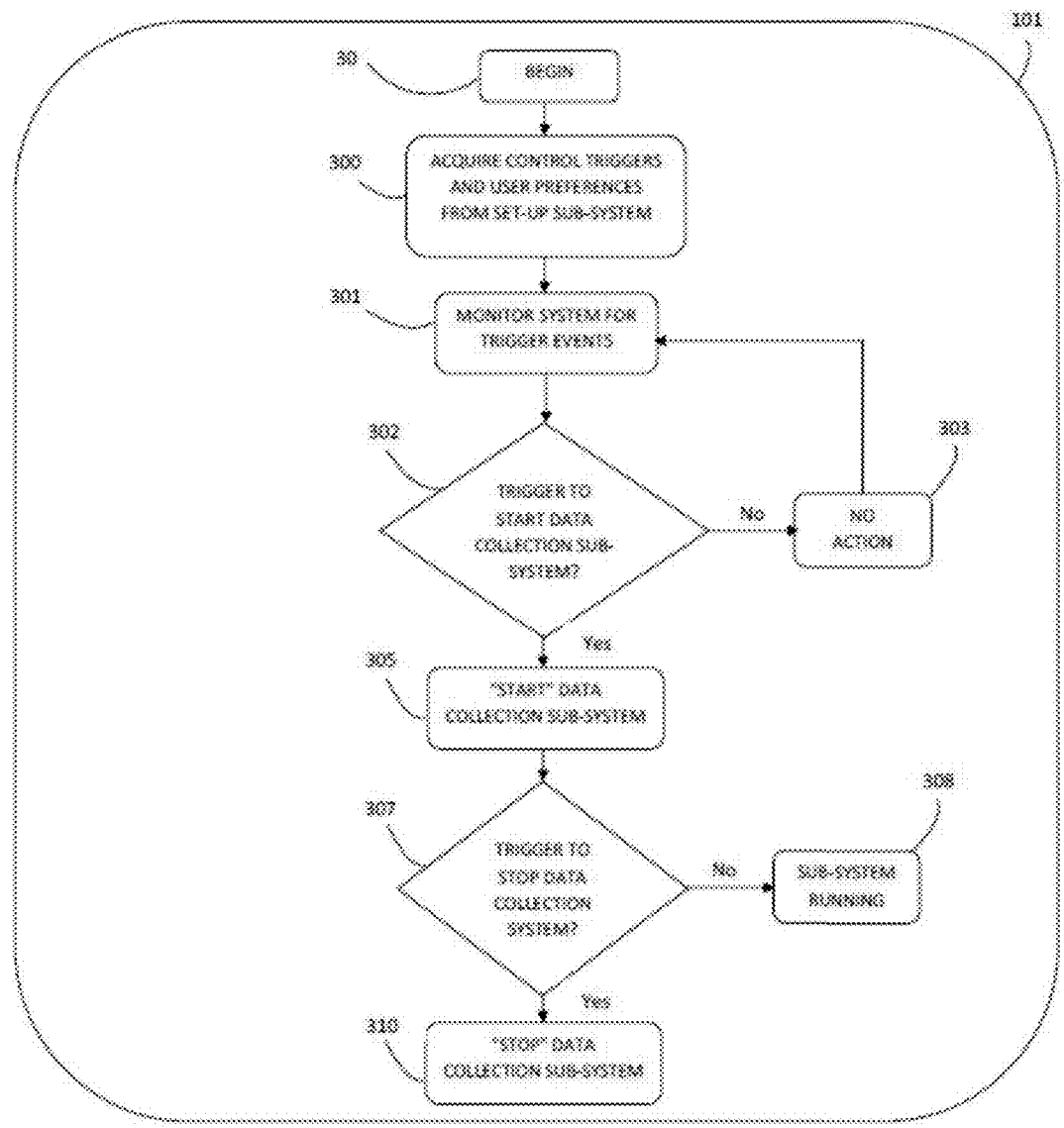
FIG. 3A is a flow chart illustrating the operation of administrative control subsystem of a system for monitoring and classifying vehicle operator behavior of the present invention with regard to data collection.
Figure 3B:
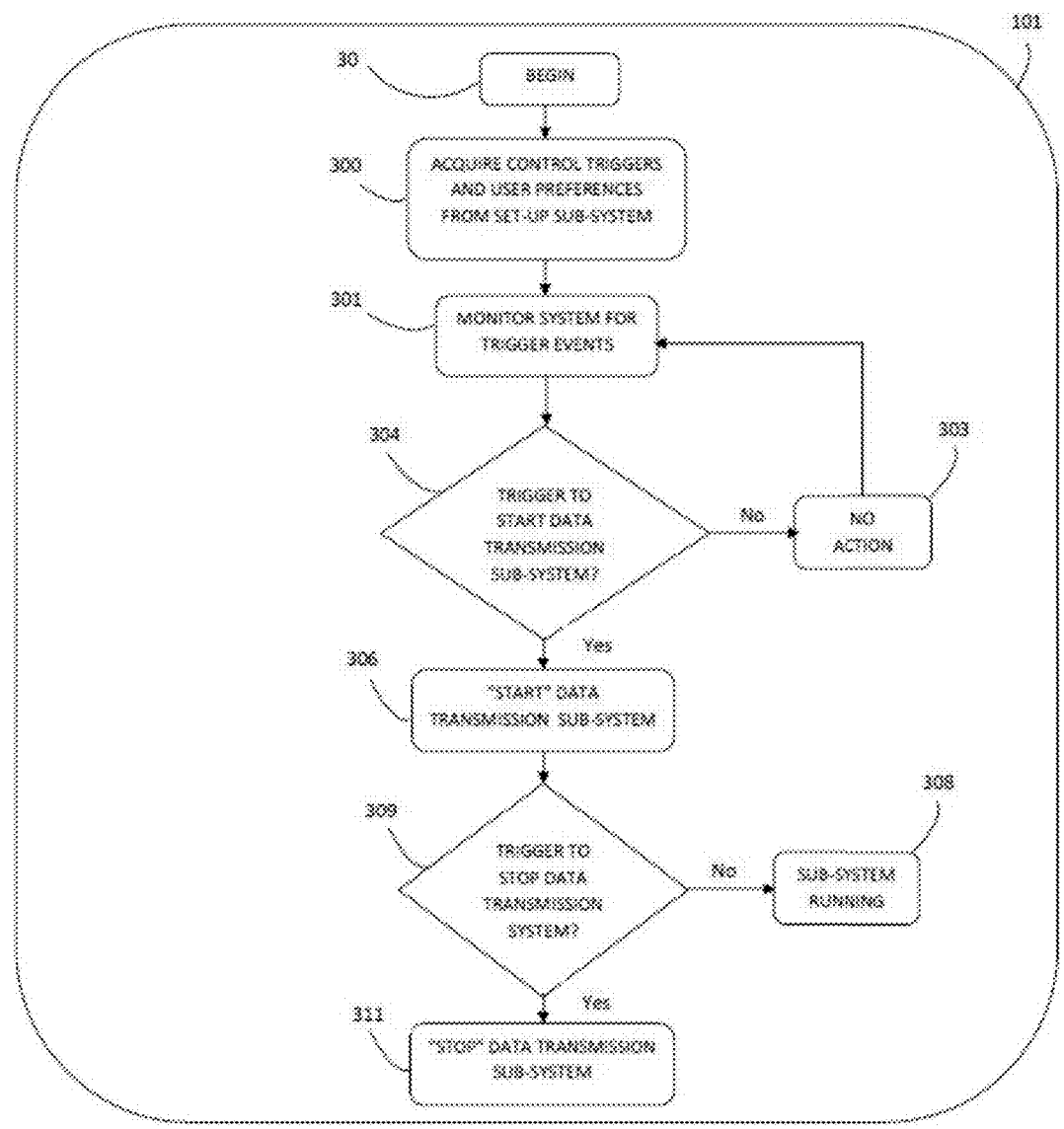
FIG. 3B is a flow chart illustrating the operation of administrative control subsystem of a system for monitoring and classifying vehicle operator behavior of the present invention with regard to data transfer.
Figure 3C:
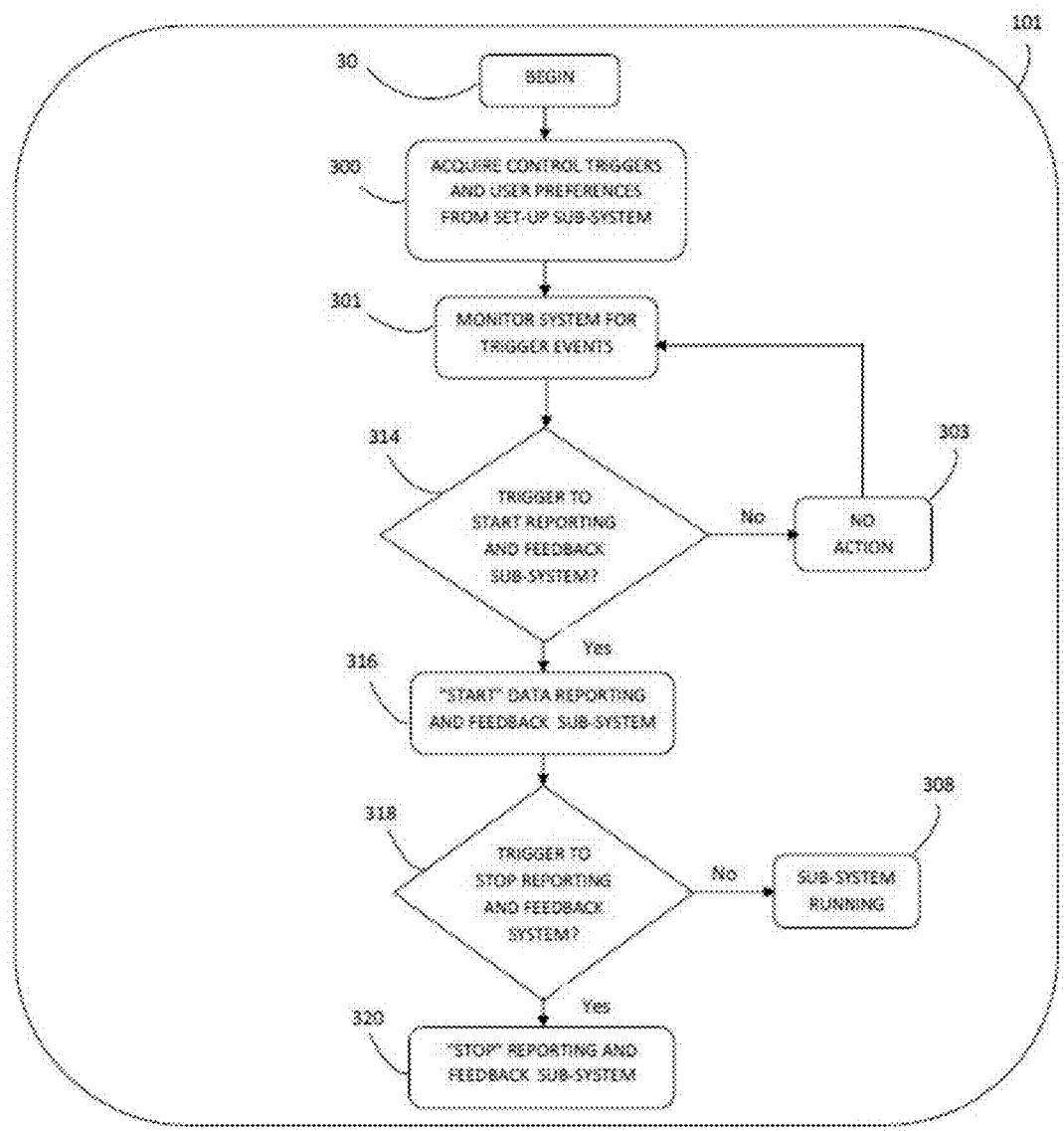
FIG. 3C is a flow chart illustrating the operation of administrative control subsystem of a system for monitoring and classifying vehicle operator behavior of the present invention with regard to reporting and feedback.

The flow charts provided in FIGS. 3A-3C illustrate the functionality and operation of administrative control subsystem 101, which controls the operations of all the other subsystems in a monitoring system 10. The administrative control subsystem 101 monitors the system 10 for a plurality of trigger events to start, stop or modify the behavior of the other subsystems. In FIG. 3A, the administrative control subsystem 101 controls the operation of data collection subsystem 102 by beginning at step 30, acquiring control triggers and user preferences from the set-up subsystem 100 at step 300 and monitoring the system 10 for trigger events at step 301. Decision step 302 is based on the presence of a trigger, or the lack thereof, to initiate the data collection subsystem 102. Lack of a trigger results in no action at step 303, while the presence of a "start" trigger initiates the data collection subsystem 102 at step 305. Decision step 307 is based on the presence of a trigger, or the lack thereof, to terminate the data collection subsystem 102. Lack of a trigger results in continued running of the data collection subsystem 102 at step 308, while the presence of a "stop" trigger terminates the data collection subsystem 102 at step 310. Examples of trigger events used by the data collection sub-system 102 includes time of day, speed above predetermined speed, change in heart rate, presence of blood alcohol above predetermined level, change in location, force start and force stop among others. Examples of additional triggers are included in table in FIG. 6. In FIG. 3B, the administrative control subsystem 101 controls the operation of data transmission subsystem 103 by beginning at step 30, acquiring control triggers and user preferences from the set-up subsystem 100 at step 300 and monitoring the system 10 for trigger events at step 301. Decision step 304 is based on the presence of a trigger, or the lack thereof, to initiate the data transmission subsystem 103. Lack of a trigger results in no action at step 303, while the presence of a "start" trigger initiates the data collection subsystem 103 at step 306. Decision step 309 is based on the presence of a trigger, or the lack thereof, to terminate the data transmission subsystem 103. Lack of a trigger results in continued running of the data transmission subsystem 103 at step 308, while the presence of a "stop" trigger terminates the data transmission subsystem 103 at step 311. Examples of trigger events used by the data transmission sub-system 103 includes time of day, presence of local data file, proximity of multiple components of the system 10, file size, force start and force stop among others. Examples of additional triggers are included in table in FIG. 6. In FIG. 3C, the administrative control subsystem 101 controls the operation of reporting and feedback subsystem 107 by beginning at step 30, acquiring control triggers and user preferences from the set-up subsystem 100 at step 300 and monitoring the system 10 for trigger events at step 301. Decision step 314 is based on the presence of a trigger, or the lack thereof, to initiate the data reporting and feedback subsystem 107. Lack of a trigger results in no action at step 303, while the presence of a "start" trigger initiates the data reporting and feedback subsystem 107 at step 316. Decision step 318 is based on the presence of a trigger, or the lack thereof, to terminate the data reporting and feedback subsystem 107. Lack of a trigger results in continued running of the data reporting and feedback subsystem 107 at step 308, while the presence of a "stop" trigger terminates the data reporting and feedback subsystem 107 at step 320. Examples of trigger events used by the reporting and feedback sub-system 107 includes time of day, achievement of predetermined goal, presence of data, message from central control event, distance from predetermined location, system alerts, force start and force stop among others. Examples of additional triggers are included in table in FIG. 6. Additional triggers used by the system 10 includes presence of valid license agreement, datalink between components of monitoring system 10, battery level, number of attempts, restarting of a component of the monitoring system 10, among others. The administrative control subsystem 101 or other sub-systems would use these triggers to start, stop or modify the behavior of the components of the present invention.

Figure 4:
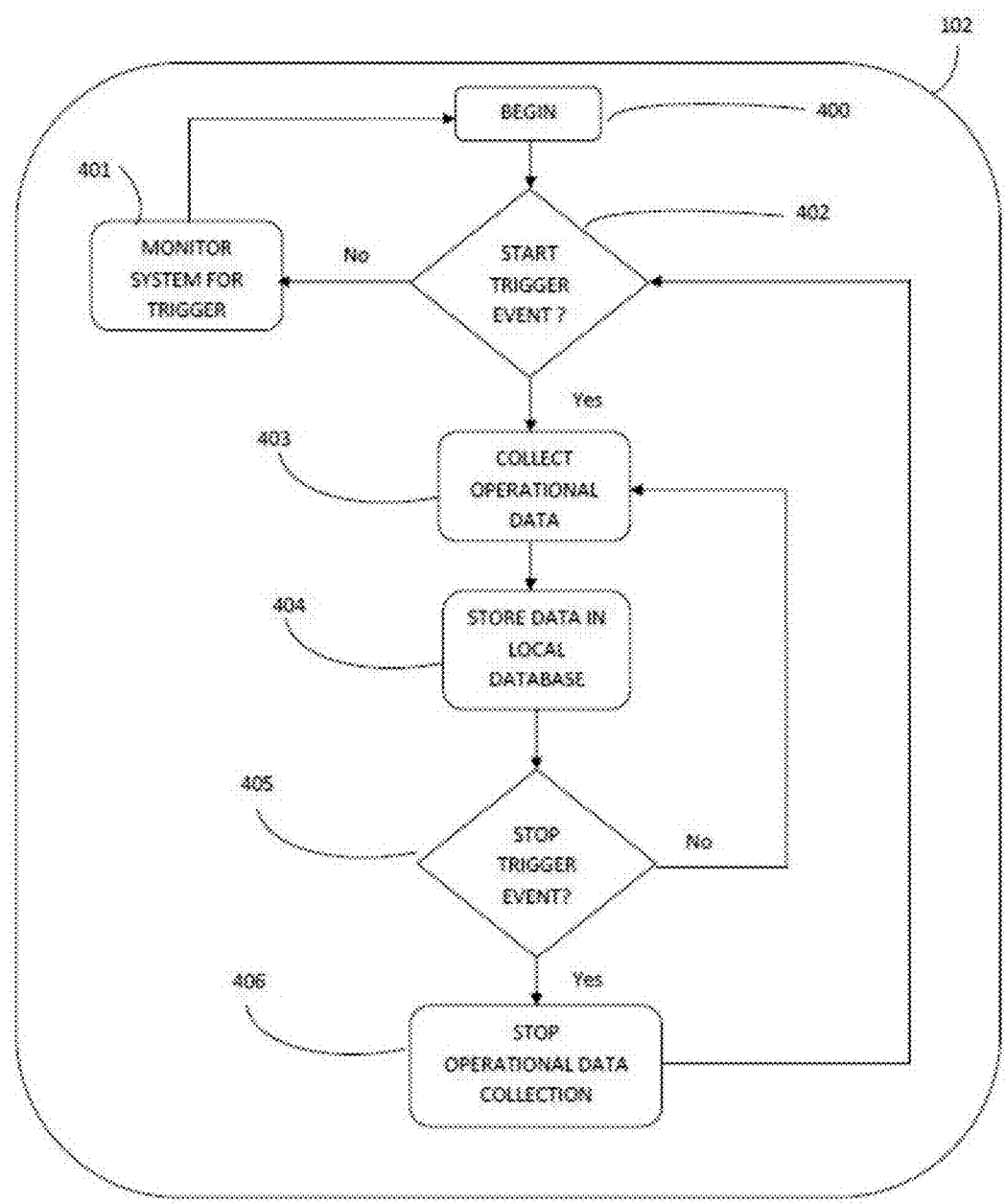
FIG. 4 is a flow chart illustrating the operation of data collection subsystem of a system for monitoring and classifying vehicle operator behavior of the present invention.

The flow chart provided in FIG. 4 illustrates the operations of the data collection subsystem 102, which collects data based on predetermined trigger events. Operation of data collection subsystem 102 begins at step 400 and proceeds to decision step 402. If no "start" trigger event has occurred, the data collection subsystem 102 continues to monitor system 10 for trigger events at step 401. If a "start" trigger event has occurred at decision step 402, the data collection subsystem 102 begins to collect operational data at step 403. This data is then stored in local database 104, which typically resides on a mobile phone, personal monitoring device or similar devices, at step 404. This cycle will continue until a "stop" trigger event occurs at step 405 at which point the data collection subsystem 102 will cease collecting operational data and/or other data. An example of a trigger event would be detecting predetermined speed of motion. Another example of a trigger event would be detecting physical activity like walking, running etc. Another example of a trigger event would be a system alarm or predetermined time intervals. The data collection subsystem 102 would use the "start" trigger to start collecting operational data. The data collection subsystem 102 is operative to monitor and record data when the operator is driving motor vehicle as well as when the operator is not driving the motor vehicle. The data collection subsystem 102 is typically operative to monitor and record certain data such as, for example, date; time; current geographic location; speed of motion; direction of motion; use of cellular phone by the operator; drug and alcohol use by the operator; amount of physical activity; and health and fitness of the operator. The data may then be used to calculate and derive or determine other relevant factors such as, for example, rapid acceleration; rapid deceleration; change in direction; speed of change in direction; distance travelled; total travel time; amount of sleep or rest; heart rate above or below predetermined levels; blood alcohol level above predetermined levels; level of alertness; level of physical activity above or below predetermined physical activity level; response time; change in relevant factors over time; among others. The data collection subsystem 102 typically utilizes multiple sensors and services (e.g. one or more internal sensors and various application software) resident on or available to (i.e., external to) the mobile device 700 and/or the personal monitoring device 120, or combinations thereof, such as, for example, a compass; an accelerometer; a gyroscope, a global positioning system (GPS); an atomic clock; temperature and weather monitoring; cell phone tower triangulation; a heart rate monitor; electrocardiogram; thermometer; blood alcohol monitor; blood oxygen monitor; blood glucose monitor; and internet access and data-link.

Figure 5:
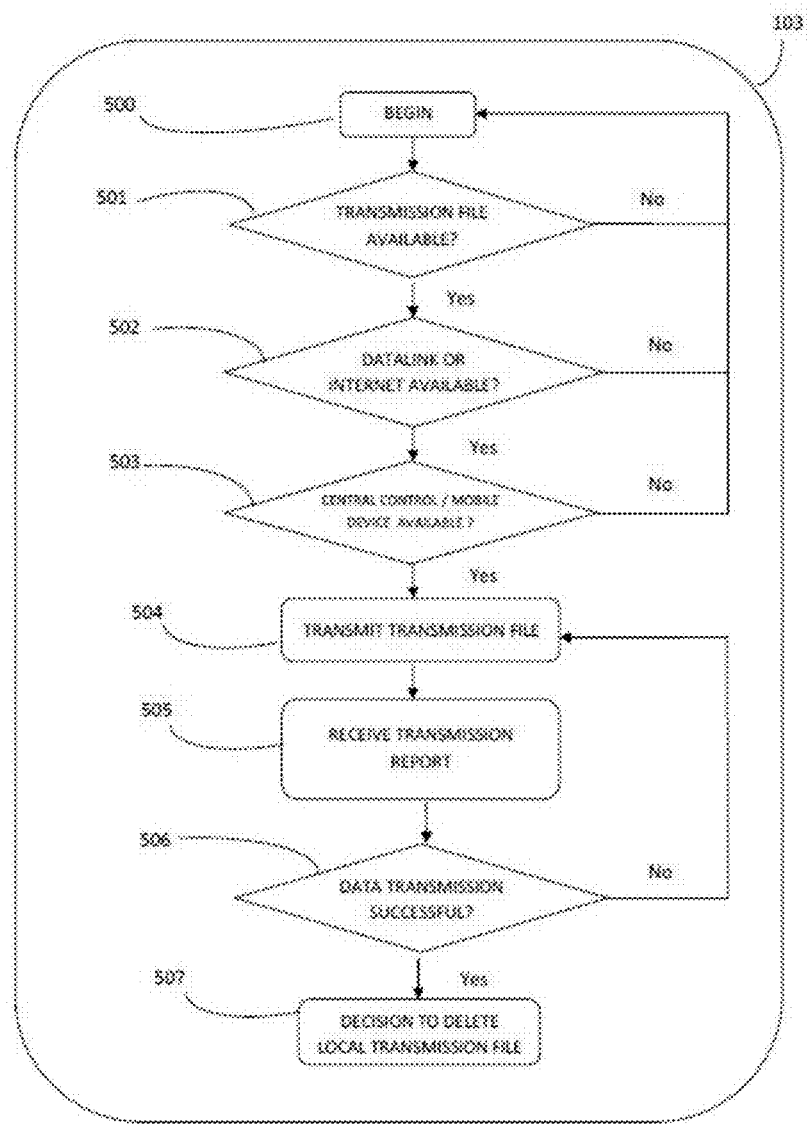
FIG. 5 is a flow chart illustrating the operation of data transmission subsystem of a system for monitoring and classifying vehicle operator behavior of the present invention.

FIG. 5 is a flow chart illustrating the operations of the data transmission subsystem 103, which monitors and manages transmission files 105, which are resident on the mobile device or on the personal monitoring device 120. The transmission files 105 may be created by the various sub-systems in the monitoring system 10. Operations of the data transmission subsystem 103 begins at step 500 and proceeds to decision step 501. If a transmission file 105 is available at step 501, the data transmission subsystem 103 then checks for the presence of a datalink and/or internet access at step 502. If a datalink and/or internet access is confirmed, the data transmission subsystem 103 then checks for the availability of central control system 106 or handheld mobile device 700 at step 503 based on where the data needs to be transmitted. If the availability of the central control system 106 or the handheld mobile device 700 is confirmed, the data transmission subsystem 103 will transmit the local transmission files 105 to the central control system 106 or the handheld device 700 at step 504 and then receive a transmission file 505 from the central control system 106 or the handheld mobile device 700 at step 505. The data transmission subsystem 103 may use one or more encryption technologies while communicating with internal and/or external components of the system 10. If the transmission file 505 confirms the data transmission was successful at step 506, the data transmission subsystem 103 will then determine the need to keep the local transmission file 105 at step 507 or to free up local resources (i.e., memory) by deleting the local transmission file 105. The data transmission subsystem 103 may utilize one or more data transmission technologies such as, for example, wired and wireless connections, internet, Wi-Fi, Bluetooth, infrared, radio signals, sound waves, electromagnetic signals, thermoelectric signals, cellular networks 118, satellites 116, among others. In some embodiments, data transmission occurs in real-time and in other embodiments, the transmission files 105 are stored in the mobile device 700 or the personal monitoring device 120 for a period of time prior to transmission.

With reference again to FIG. 1A-1E, the central control system 106 is operative to compare collected, calculated and/or derived data to known or predetermined parameters and conditions. Observed, calculated and/or derived information may include information relevant to the behavior and/or characteristics of the vehicle operator, the vehicle, the geography, the environment or combinations thereof, such as, for example: time of day; presence of accident; road construction; full or partial road closures; snowfall; rainfall; fog; health and fitness level; medical condition; drug or alcohol use; among others. Predetermined parameters and conditions may be grouped based on quantitative patterns, relationships and interrelationships such as, of example: vehicles driving within predetermined miles per hour groups; vehicles with predetermined cargo capacity groups; amount of driving and non driving time; total amount of driving; number of geographies visited; operators with predetermined amount of sleep deprivation; operators with predetermine fitness level groups; operators with predetermined amount of drug or alcohol in body groups; operators using predetermined amount of mobile phone while driving group; operators taking predetermined amount of rest/breaks groups; geographies with predetermined speed limit groups, geographies by distance from predetermined location groups (e.g. ocean, warehouse, school); type of terrain groups (e.g., long straight roads, meandering mountain roads); altitude from sea level group; time of day groups; amount of snowfall in predetermined period groups; among others. Observed behavior may be enhanced by adding self reported and/or third party information such as, of example: operators in predetermined demographic groups; operators in predetermined age groups; operators within predetermined credit score groups; operators with predetermined driving history groups (e.g. accidents, traffic violations, experience driving predetermined cargo/passenger or lack thereof); operators with predetermined medical condition groups; number of passengers or amount of cargo in the vehicle groups; actuarial information relevant to motor vehicle insurance; actuarial information relevant to health and medical insurance; actuarial information relevant to life insurance; life expectancy; mortality rates; among others. One or more algorithms within the central control system 106 may classify the operator, the vehicle, the geography, the environment or combinations thereof, differently at different times based on available information such as, for example: placing an operator operating a motor vehicle at a posted speed limit under one group or classification when no road construction is present and placing the same operator under another group or classification when road construction is present; placing an operator operating a motor vehicle at posted speed limit under one group or classification when there is no snowfall and placing the same operator under another group or classification when there is snowfall in excess of selected amount; among others. The behavior and/or characteristics may be placed in appropriate reference group for further processing, predictive modeling, decision modeling, descriptive modeling or combinations thereof.

Classifications and groupings may be designed for specific purpose or multiple purposes by selecting and grouping information relevant to the purpose from the information collected (observed, self reported, from third parties or combinations thereof) and/or derived. A user of the system 10 may be able to configure the system 10 for one or more specific purposes. In some embodiments the user may change the configurations and/or specific purposes multiple times while in other embodiments the configurations and/or specific purposes may not be changed after the initial selection. Further, some embodiments may allow a user to configure the system 10 to use for more than single purpose at the same time. An example of classifications and groupings, with regard to specific purpose such as for example vehicle fleet management, may include: operator availability; distance/time from a predetermined location groups; available capacity groups (e.g. ability to pick up passengers or cargo for transportation); type of goods that may be transported groups (e.g. liquids, dry, refrigerated, medical); experience with type of goods/passengers to be transported; desired time of delivery/pickup groups; and the amount of driving time and non-driving time recorded groups; among others. Another example of classifications and groupings, with regard to specific purpose, such as for example health and medical insurance, may include: medical history groups; family medical history groups; type of allergies group; gender; ethnicity; distance from medical facility offering predetermined services; amount of driving; type of driving (e.g. high/low risk driving, transport hazardous material, amount of cellular phone use while driving, etc); air pollution levels measured in geographies visited; diseases and infections present in geographies visited; level of physical activity; lifestyle (e.g. amount of sleep, amount of alcohol use, etc.); actuarial information relevant to health and medical insurance; life expectancy; mortality rates; among others.

One or more algorithms may also provide classifications, ranking and rating based on relative classifications of the operators, the vehicles, the geographies, the environment or combinations thereof such as, for example: the average speed of operators using the system 10 could be determined for a predefined area at a predetermined time and a relative classification could be assigned to any operator deviating from the average speed; average ratio of driving time to resting time within predetermined time period (e.g. 24 hours, week among other) may be determined and a relative classification could be assigned to any operator deviating from the average amount of driving time to resting time ratio; average distance travelled within a predetermined time period (e.g., night, rush hour, day, month and year, among others) could be determined and a relative classification may be assigned to any operator deviating from the average distance travelled; average number of geographies visited within a predetermined time period (e.g. week, month, year among others) may be determined and relative classification may be assigned to any operator deviating from the average geographies visited; average cargo and/or passenger load for a predetermined class of vehicle could be predetermined and a relative classification may be assigned to any operator deviating from the average amount of cargo and/or passenger load for a class of vehicle; among others. Operator driving history such as, for example: a history of previous traffic incidents including accidents and traffic violations may also be used to determine or assign groups or classifications. Operator medical history such as, for example: history of allergies, medical conditions, previous illness, pregnancy and predispositions to certain illnesses or medical conditions based on family history may also be used to determine or assign groups or classifications.

One or more algorithms may further provide classifications, ranking and rating derived from information collected over time such as, for example: average behavior of an operator may be classified relative to behavior when geographic location is experiencing rain, snow or road construction; average driving speed may be classified under different light conditions; average driving and non-driving time in a geographic location may be classified relative to each other; average behavior during day, night and/or rush hour may be classified relative to each other; average behavior of an operator before, during and after predetermined actions or conditions (e.g., pregnancy; physical exercise; drug or alcohol use; texting or talking and driving; temporary or long term illness; commuting or vacationing among others) may be classified relative to each other; average behavior when the motor vehicle has been modified (e.g., for towing or carrying passenger and/or cargo; for farm use; for sporting activity among others) may be classified relative to each other and average behavior when there are no such modifications, among others.

One or more algorithms may determine presence of duplicate information for the same activity such as, for example: mobile device and personal monitoring device both recording the amount of physical activity at the same time (e.g. running, walking) for an operator; and mobile device and personal monitoring device both recording speed of motion at the same time for an operator, among others. One or more algorithms may further determine presence of contradiction in the data collected through multiple components of the system 10 such as, of example: information from mobile device showing rest while information from personal mobile device showing physical activity for an operator; information from mobile phone and personal monitoring device showing different speed of motion for a vehicle; self reported and driving records showing different number of traffic violations; among others. One or more algorithms may further determine presence of information gaps or data errors, such as for example: information not collected when the battery resident of personal monitoring device is being charged; information gap when the operator is not carrying the mobile device; data errors due to low memory levels; data errors due to device operating system failure, among others. One or more algorithms may further determine presence of information biases, such as for example: information only collected or missing for certain time of day; sample data collected has greater/under representation of certain information; limited data collected for a demographic group; statistically insufficient data; among others. One or more algorithms may utilize various methodologies for data cleansing, sanitizing and enhancement to handle data issues such as, for example: suppress or eliminate appropriate data points; select primary data source; supplementary/complementary data; combine data; data sampling; clustering; or other statistical processes; among others.

Figure 18:
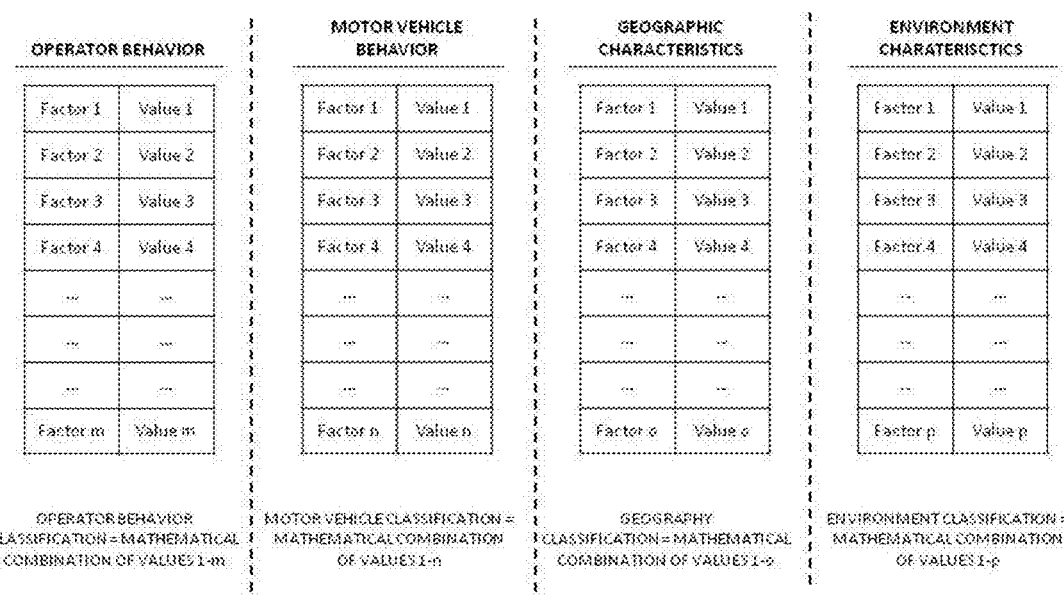
FIG. 18 is an illustration of an example of classification, groupings and calculations in accordance with a system for monitoring and classifying vehicle operator behavior.

One or more statistical and mathematical processes and/or algorithms may further provide grouping to the operator behavior, the vehicle behavior, the geography, the environment or any combinations thereof based on quantitative patterns, relationships and interrelationships as depicted in a FIG. 18. Use of statistical and mathematical processes to group and classify all operator behaviors, vehicle behaviors, geographical characteristics and environmental characteristics greatly reduces the computational power required compared to using every variation of operator behaviors, vehicle behaviors, geographical characteristics and environmental characteristics (which may be infinite) and thus, greatly improves the efficiency of the system 10 such as, for example, using distance travelled in groups of 1000 miles vs. using very single mile travelled independently; using number of steps walked/run per day in increments of 2000 steps vs. using every single step count independently; among others. Further, the use of statistical and mathematical processes to group and classify all information collected reduces computational power required to process the information as compared to using such methods on only a portion of information and not on others (e.g. only using statistical and mathematical processes to group and classify the operator behavior and the vehicle behavior but using every variation of geographical characteristics and environmental conditions). Further, the use of statistical and mathematical processes to group and classify all operator behaviors, vehicle behaviors, geographical characteristics and environmental characteristics produces more comprehensive results compared to using such methods on only few combinations of operator behaviors, vehicle behaviors, geographical characteristics and environmental characteristics and using only specific characteristics of others i.e. not using all available information (e.g. using statistical and mathematical processes to group and classify the operator behavior and the vehicle behavior but only using specific characteristics of the geographical conditions and specific characteristics of the environmental conditions i.e. not using all available geographical and environmental conditions).

Statistical and mathematical processes may be further used to develop predictive models, decision models and/or descriptive models. Analytical techniques used to provide grouping, classifications, ranking and rating to the operators, the vehicles, the geographies, the environment or any combinations thereof may further include regressions techniques such as, for example: Linear regression model, Discrete choice model, Logistic model, Multinomial model, Probit model, Logit model, Time series model, Survival or duration model, Classification and regression trees, Multivariate models and Multivariate adaptive regression splines; machine learning techniques such as, for example: Neural networks, Multilayer Perceptron, Radial basis functions, Support vector machines, Naive Bayes, k-nearest neighbours and Geospatial predictive modeling; or combinations thereof.

Classification, ranking and rating may be used to determine employability in trade such as, for example: private and public transportation drivers; school bus drivers; police, ambulance, fire and/or emergency services providers; race car drivers; driving school instructors; hazardous material driver; trucking and cargo drivers; travelling sales personnel; insurance claims personnel; taxi drivers; and delivery service drivers; among others. Vehicle operators that meet predetermined criteria and/or rank above a predetermined threshold may qualify for employment while others that do not meet the predetermined criteria and/or rank below the threshold may not qualify for employment. Further, the classification, ranking and rating may be used to determine pay rate or compensation when vehicle operators are found to qualify for employment such as, for example: vehicle operators that are ranked or rated highest are paid and/or compensated more than vehicle operators that are ranked below them; average operator is paid predetermined pay rate and/or compensation while operators ranked higher and/or lower are paid or compensated on a relative basis; among others. Further, information collected or derived by system 10 may be used to periodically update the employability and compensation rate decision (e.g. insufficient information at the time of initial employment or compensation decision is updated after evaluation period; annual compensation is updated based on performance over predetermined period, etc.)

Classification, ranking and rating may be further designed for the purpose of determining perks, services, discount and/or surcharge in travel and tourism industry such as, for example: rental car companies using predetermined criteria to determine whether or not to rent to potential vehicle renter; rental car companies determining cost of rental and/or insurance; rental car companies determining rewards, discount or marketing offers; hotel and/or airline companies determining cost of their goods and/or services; hotel and/or airline companies determining rewards, discount or marketing offers; and travel services company determining rewards, discount or marketing offers, among others. Further, information collected or derived by the system 10 may be used to periodically update the pricing, reward or other services and benefits (e.g. rental car companies offering lower price to operators driving in lower risk geographies or exhibiting lower risk driving behavior etc.)

Classification, ranking and rating may be further used to determine qualification and/or the cost of motor vehicle insurance. Vehicle operators that meet predetermined criteria and/or rank above a predetermined threshold may qualify for motor vehicle insurance while others that do not meet the predetermined criteria and/or rank below the predetermined threshold may not qualify for motor vehicle insurance offered by an insurance company (different motor vehicle insurance programs may use different thresholds). Further, the classification, ranking and rating may be used to determine the cost of insurance such as, for example: when vehicle operators are found to qualify for motor vehicle insurance by an insurance company, vehicle operators that are ranked or rated highest pay a lower cost for motor vehicle insurance compared to vehicle operators that are ranked below them; average drivers is charged predetermined cost of insurance while drivers ranked higher and/or lower are charged on a relative basis; among others. Further, information collected or derived by the system 10 may be used to periodically update the insurability and/or cost of motor vehicle insurance (e.g. motor vehicle insurance premium is updated periodically, e.g. at renewal, based on updated classification or ranking; insufficient information at the time of initial motor vehicle insurance sale is updated after evaluation period; driving behavior is used to determine fault after the operator is involved in an motor vehicle accident and motor vehicle insurance premium is adjusted based on predetermined criteria, etc.)

Classification, ranking and rating may be further used to determine qualification and/or the cost of medical and health insurance. System 10 users that meet predetermined criteria and/or rank above a predetermined threshold may qualify for health insurance while others that do not meet the predetermined criteria and/or rank below the predetermined threshold may not qualify for health insurance offered by an insurance company (different health insurance programs may use different thresholds). Further, the classification, ranking and rating may be further used to determine the cost of insurance by an insurance company, such as, for example: when a user of the system 10 is found to qualify for health insurance by an insurance company, system 10 users that are ranked or rated highest pay a lower premium for health insurance compared to system 10 users that are ranked below them; average user is charged predetermined cost of insurance while users ranked higher and/or lower are charged on a relative basis; among others. Further, information collected or derived by the system 10 may be used to periodically update the insurability and/or cost of health insurance (e.g. health insurance premium is updated periodically, e.g. annually, based on updated classification or ranking; insufficient information at the time of initial health insurance sale is updated after evaluation period and health insurance premium adjusted accordingly, etc.)

Classification, ranking and rating may be further used to manage fleet operations such as, for example: align vehicle operators and projects based on operator classification and history; determine best route to transport cargo or passengers between predetermined locations; determine new routes to transport cargo or passengers between predetermined locations when route determined earlier is no longer available; provide new cargo when already dispatched cargo is unable to reach predetermined location on time and/or with desired quality; to provide dispatch and/or passenger pickup services; determine best route to intercept criminal and/or illegal activities; determine best way to provide logistical support to predetermined locations and/or facility; and determine best route to evacuate in case or emergency; among others.

Classification, ranking and rating may be further used to provide marketing services such as, for example: location based services (e.g. food, shopping, sports, entertainment, transportation, tourism and hotels among others); delivery services (e.g. food, groceries, shopping, medicines, cargo and personal services among others) qualification for motor vehicle insurance; cost of motor vehicle insurance; employment offers; compensation; fleet management; and educational among others.

Classification, ranking and rating may be further used to provide educational programs such as, for example: young driver education; driving license examination (e.g. operator behavior observed for extended period of time instead of one time driving exam; operators need to cross predetermined thresholds, operators are required to exhibit predetermined behavior over predetermined period of time, etc); rehabilitation after injury and/or illness; driver safety education (e.g. exhibit safe driving behavior over predetermined period); food and nutrition education; commercial driving education to non-commercial drivers; operating specialized motor vehicles; and operating predetermined type of vehicles; among others. (e.g. vehicle operators at the beginning of the educational program is given initial classification; this classification is updated based on operator exhibiting predetermined behavior or meeting predetermined thresholds).

Classification, ranking and rating may be further used to provide emergency services such as, for example: dispatch ambulance when health and fitness of the vehicle operator indicates certain predetermined signs (e.g. cardiac arrest); dispatch fire, police and/or ambulance in case of accident; provide relief supplies when stranded in remote location; provide evacuation services after emergency; and search and/or find services among others.

Classification, ranking and rating may be further used for law enforcement such as, for example: determine and take action against traffic violators; determine and take action against court ordered geographic boundary and/or limitation violators; determine criminal and/or illegal trespassing; and determine when a known suspect and/or fugitive is located within jurisdiction; among others. Examples of law enforcement applications include: vehicle operator exceeding speed limit on a given trip is charged appropriate penalty after the trip even when no law enforcement office caught the operator speeding during the trip; vehicle operator operating the vehicle with blood alcohol level exceeding legal limit is charged appropriate penalty after the trip even when no law enforcement office caught the operator during the trip; fault for an accident is determined based on vehicle operator behavior, among others.

Figure 7A:
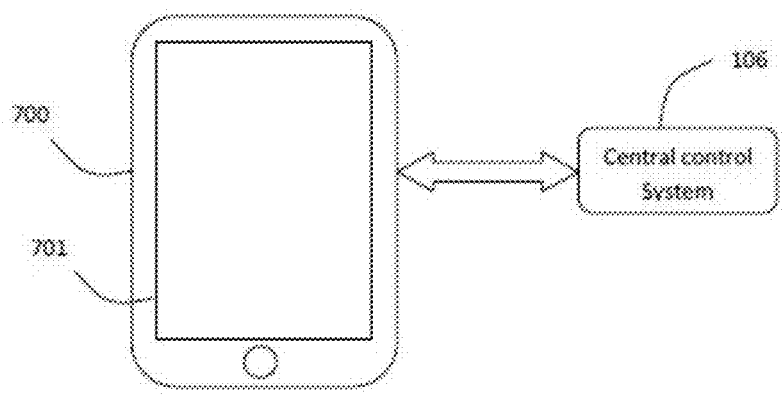
Figure 7B:
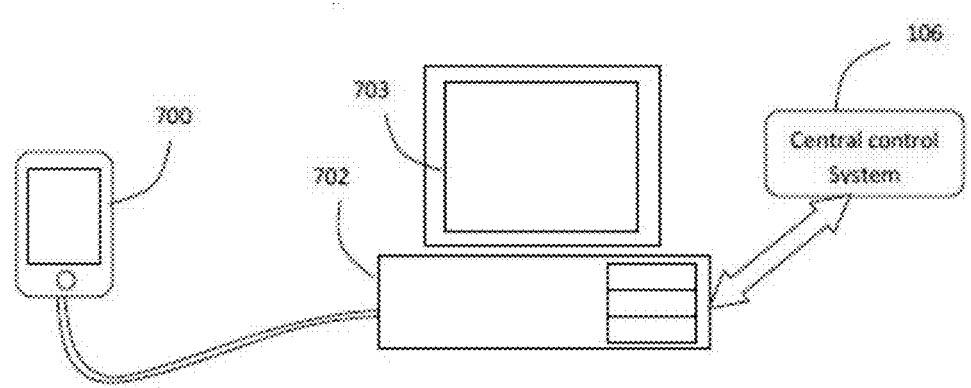
FIG. 7B depicts an embodiment of the present invention wherein the user interface includes a handheld device such as a mobile telephone and a computer.
Figure 7C:
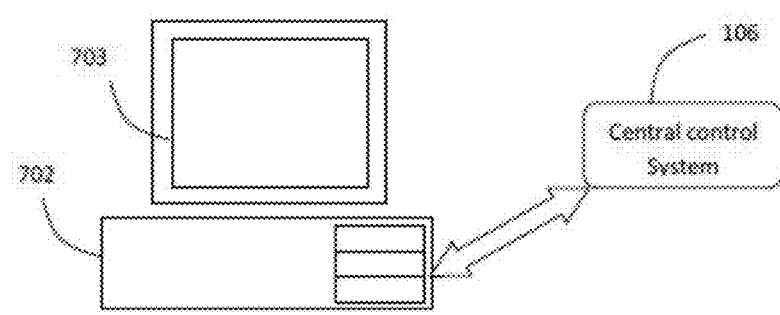
FIG. 7C depicts an embodiment of the present invention wherein the user interface includes a computer.
Figure 7D:
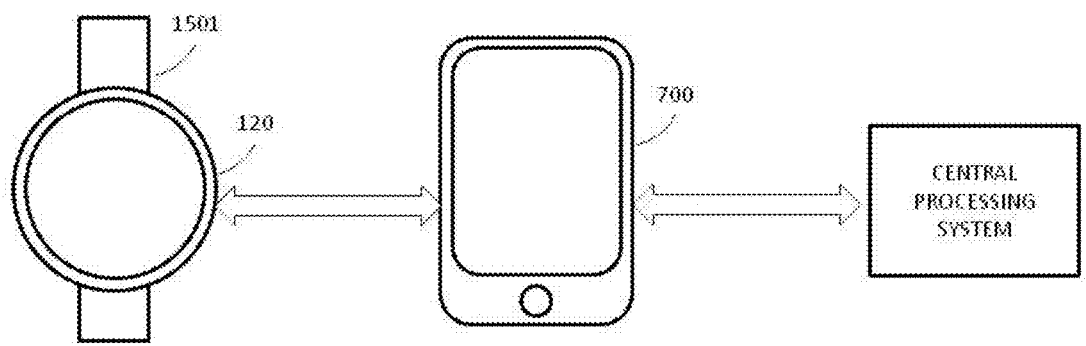
FIG. 7D depicts an embodiment of the present invention wherein the user interface includes a personal monitoring device and a mobile device.
Figure 7E:
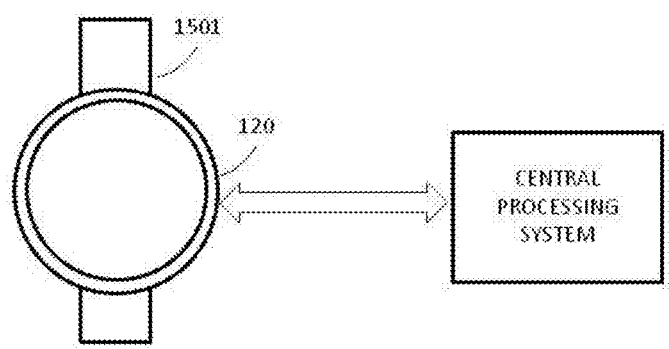
FIG. 7E depicts an embodiment of the present invention wherein the user interface includes a personal monitoring device, such as, a smartwatch, fitness tracker, portable health monitor or wearable electronic device.

FIG. 7A depicts an embodiment of the present invention wherein the user interface with the central control system 106 includes a handheld device such as mobile telephone 700 having a visual display 701. FIG. 7B depicts an embodiment of the present invention wherein the user interface with the central control system 106 includes a handheld device such as mobile telephone 700, which is in communication with a computer 702 having a visual display 703. FIG. 7C depicts an embodiment of the present invention wherein the user interface with the central control system 106 includes a computer 702 having a visual display 703. FIG. 7D depicts an embodiment of the present invention wherein the user interfaces with the central control system 106 includes a personal monitoring device 120 and a mobile device 700. FIG. 7E depicts another embodiment of the present invention wherein the user interfaces with the central control system 106 includes a personal monitoring device 120. Some or all of these embodiments may be used for the initial setup of the monitoring system 10, viewing trip summaries and/or performance reports, upgrading software, and sending information to and receiving information from the central control system 106, among other purposes.

Figure 9:
FIG. 9 is a first example of a trip summary report in accordance with a system for monitoring and classifying vehicle operator behavior of the present invention.
Figure 10:
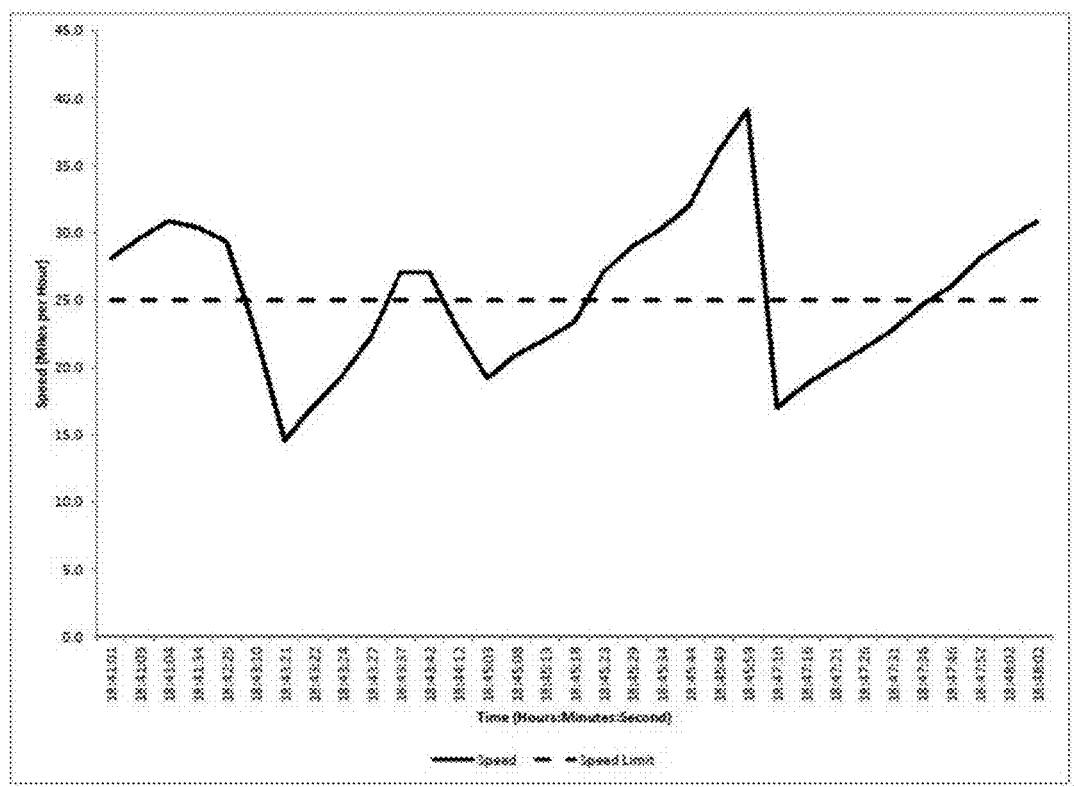
FIG. 10 is a second example of a trip summary report in accordance with a system for monitoring and classifying vehicle operator behavior of the present invention.
Figure 11A:
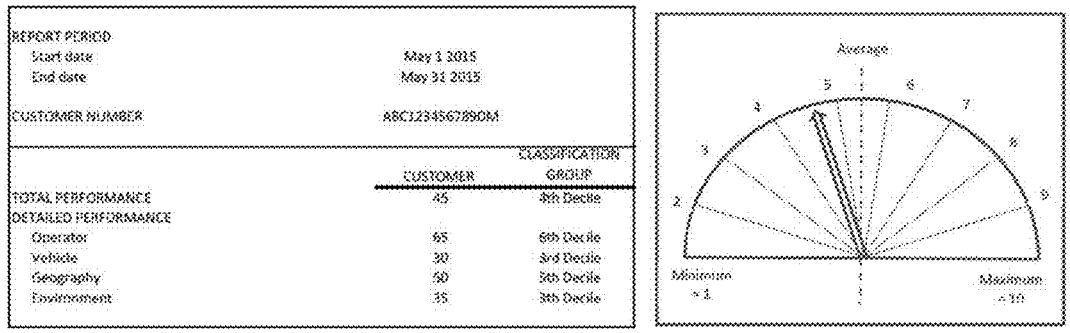
FIG. 11A is a first example of a usage summary report in accordance with a system for monitoring and classifying vehicle operator behavior of the present invention.
Figure 11B:
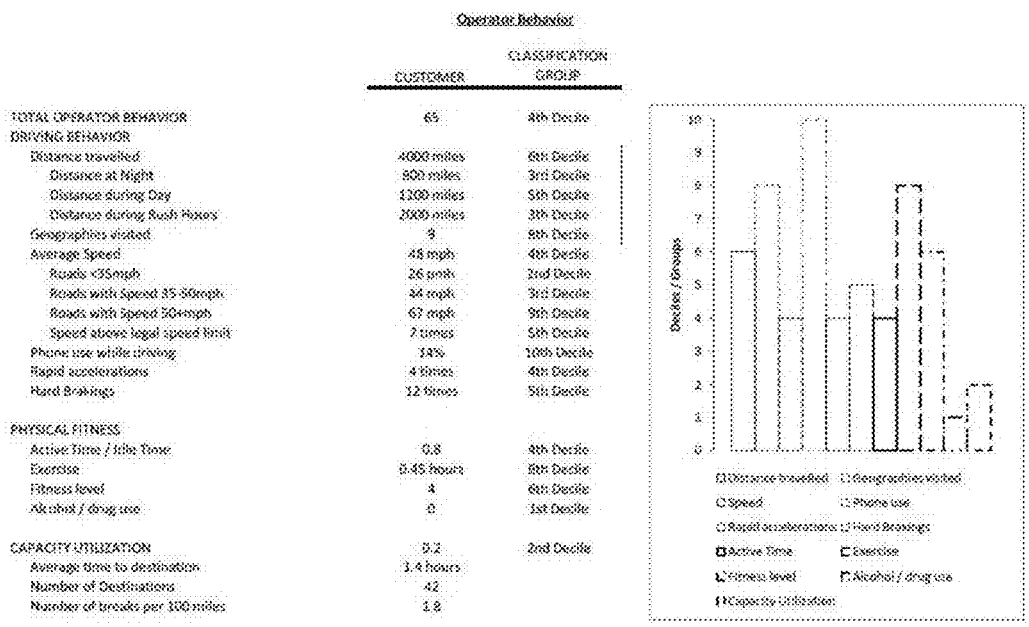
FIG. 11B is a second example of a usage summary report in accordance with a system for monitoring and classifying vehicle operator behavior of the present invention.
Figure 11C:
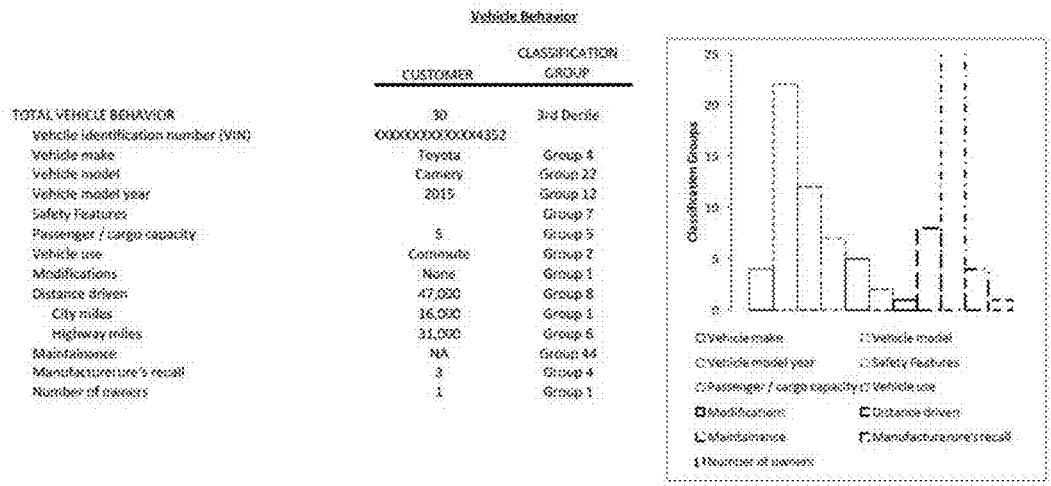
FIG. 11C is a third example of a usage summary report in accordance with a system for monitoring and classifying vehicle operator behavior of the present invention.
Figure 11D:
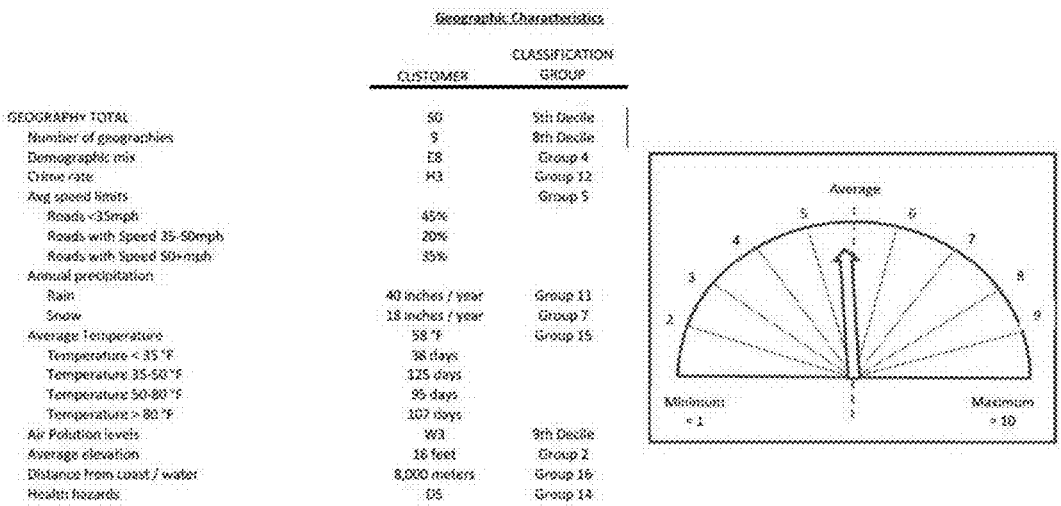
FIG. 11D is a fourth example of a usage summary report in accordance with a system for monitoring and classifying vehicle operator behavior of the present invention.
Figure 11G:
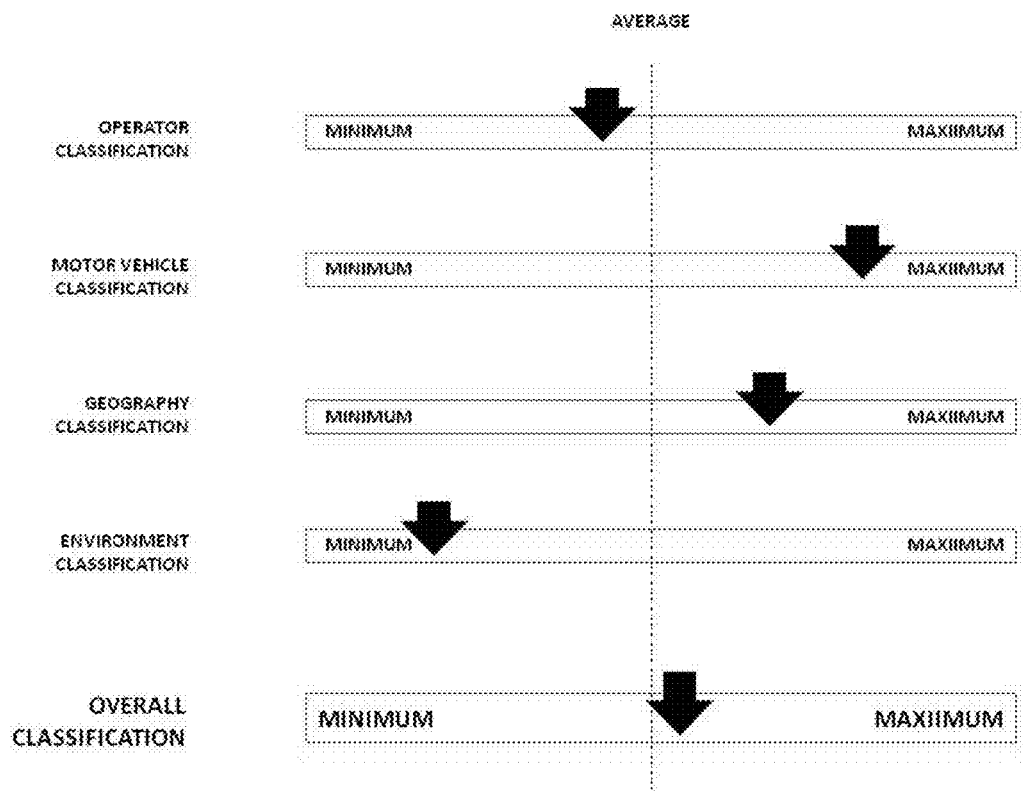
FIG. 11G is a seventh example of a usage summary report in accordance with a system for monitoring and classifying vehicle operator behavior of the present invention.

FIG. 8A depicts a sample data transmission file that includes a plurality of records, each containing some or all of the data recorded and/or derived from the data recorded by the data collection sub system 102 including date, time, vehicle speed, speed limit, zip code, direction, use of mobile phone, latitude, longitude, step count, and active time during the day. FIG. 8B depicts another sample data transmission file that includes a plurality of records, each containing some or all of the data recorded and/or derived from the data recorded by the data collection sub-system 102 including, date, time, blood pressure, blood glucose level, body temperature, heart rate, and blood alcohol level. FIG. 8C depicts another sample data transmission file that includes a plurality of records, each containing some or all of the data recorded and/or derived from the data recorded by data collection sub-system 102 including, date, time, body temperature, awake time, active time, walking step count, running step count, stairs or vertical step count, calories burnt, distance travelled. FIG. 9 is a first example of a trip summary report recorded by the data collection subsystem 102 showing a starting point for a trip, the route followed, and ending point of the trip on a map. FIG. 10 is a second example of a trip summary report recorded by the data collection subsystem 102 showing the actual speed of the vehicle and the speed limit posted on the route followed. The graphical representation may also show periods of rapid acceleration, deceleration, or hard braking. The graphical representation may include date and time of the trip. FIGS. 11A-11G provide various examples of usage reports comparing the operator, the vehicle, the geography and the environment performance to others. These reports may include summaries of various behaviors and characteristics collected including calculated and/or derived values and classifications such as, for example: an individual operator's behavior may include information about operator's driving history including miles driven; driving time; average speed; number of rapid acceleration; number of hard braking; health and fitness level; active time; driving in sleep deprivation state; calculated group ranking or classification; graphical representations of classification; graphical representation of the operator performance compared to other operators or groups; use of cellular phone; and geographies visited; among others. Reports may classify, rate and/or group the driver behavior, the vehicle behavior, the geographical characteristic and the environmental conditions based on quantitative patterns, relationships and interrelationships. The reports may include classification information about groups such as for example: the group behavior; relative ranking of the group compared to other groups; optimal range; relative risk; and productivity; among others. Reports may also include classification information based on the specific configuration of the system 10 such as, for example: specific type of employment score and/or group and information relevant to employment score and/or group; travel and entertainment score and/or group and information relevant to travel and entertainment score and/or group; risk score and/or group for motor vehicle insurance and information relevant to motor vehicle insurance score and/or group; risk score and/or group for health insurance and information relevant to health insurance score and/or group; risk score and/or group for life insurance and information relevant to life insurance score and/or group; number of milestones achieved and/or need to achieve to get driving license; among others.

Figure 12:
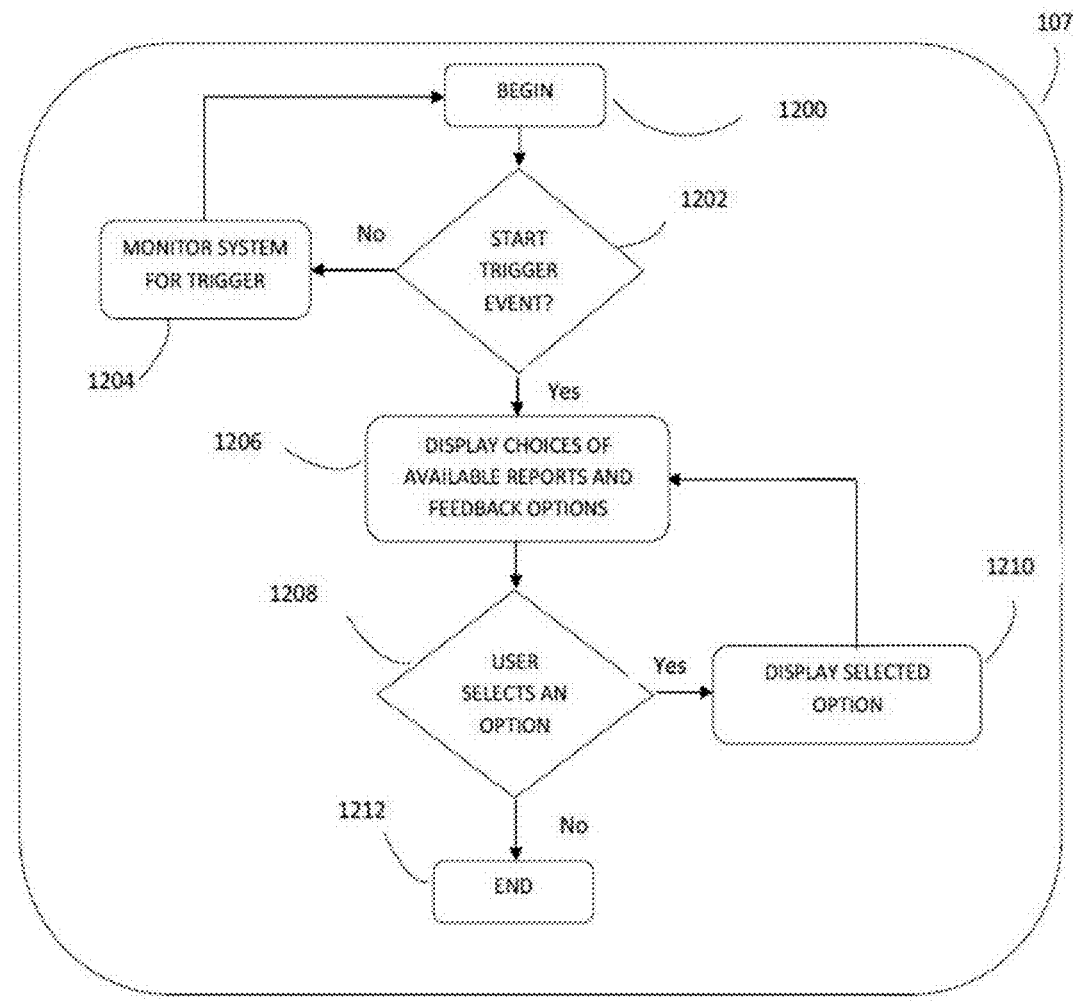
FIG. 12 is a flowchart illustrating the operation of a reporting and feedback subsystem of the present invention.

FIG. 12 is a flowchart illustrating the operation of the reporting and feedback subsystem 107. The operation of reporting and feedback subsystem 107 begins at step 1200 and proceeds to decision step 1202. If no "start" trigger event has occurred, the reporting and feedback subsystem 107 continues to monitor the system 10 for trigger events at step 1204. If a "start" trigger event has occurred at decision step 1202, the reporting and feedback subsystem 107 displays choice of available reports and feedback options at step 1206. The user selects one or more options at decision step 1208, which results in the selected option being displayed at step 1210 or the process ending at step 1212.

Figure 15:
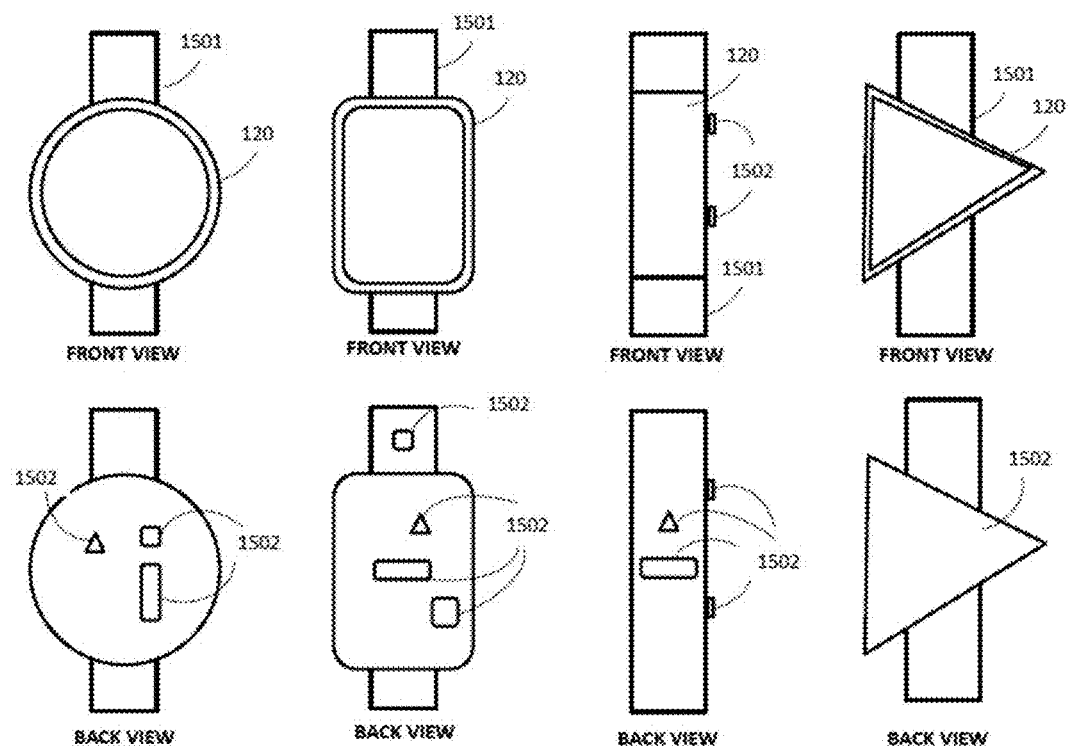
FIG. 15 depicts examples of various designs or embodiments of personal monitoring device illustrating the locations of sensors of the present invention.
Figure 17:
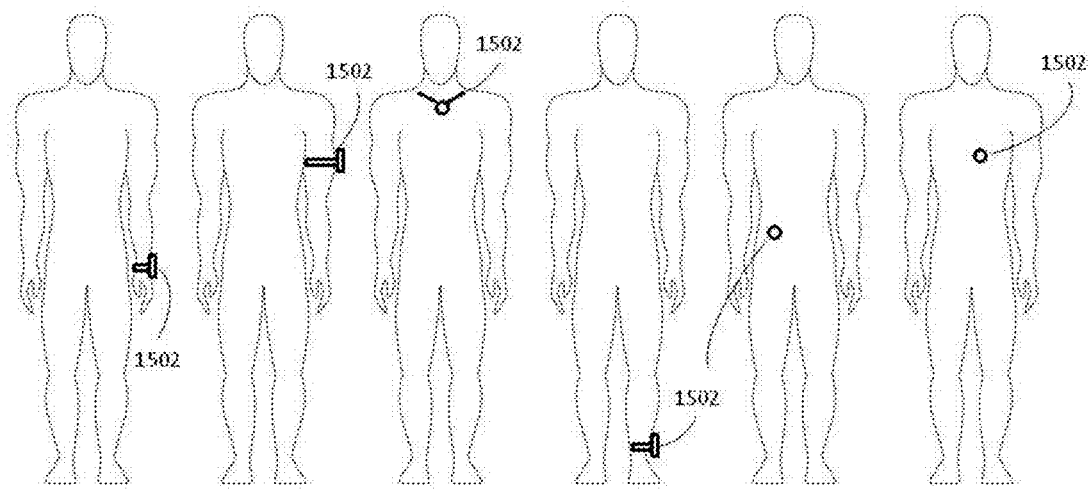
FIG. 17 is an illustration presenting examples of various location where personal monitoring device may be worn or attached to an operator in the operation of a system for monitoring and classifying vehicle operator behavior of the present invention.

FIG. 15 illustrates examples of various designs of the personal monitoring device 120 and location of various sensors 1502 (e.g. health, fitness and medical sensors, among others) on the personal monitoring device 120 of a vehicle operator monitoring and classification system of the present invention. The personal monitoring device 120 design includes watch, band and/or personal clothing item (e.g. hat, shirt, gloves, shoe among others). The personal monitoring device includes one or more mechanism for the operator to wear or attach the device to themselves including a strap, a band, Velcro, tape or equivalent 1501. The personal monitoring device may be worn; attached directly or indirectly (e.g. over clothing item); kept in close proximity; or combinations thereof, to the operator at various locations as illustrated in FIG. 17 (among others). The sensors 1502 resident on the personal monitoring device may be arranged in various positions/locations including back, side, band or combinations thereof. The sensors 1502 may or may not be placed externally or placed inside a protective covering and thus may or may not be visible to operator as depicted in FIG. 15.

Figure 16A:
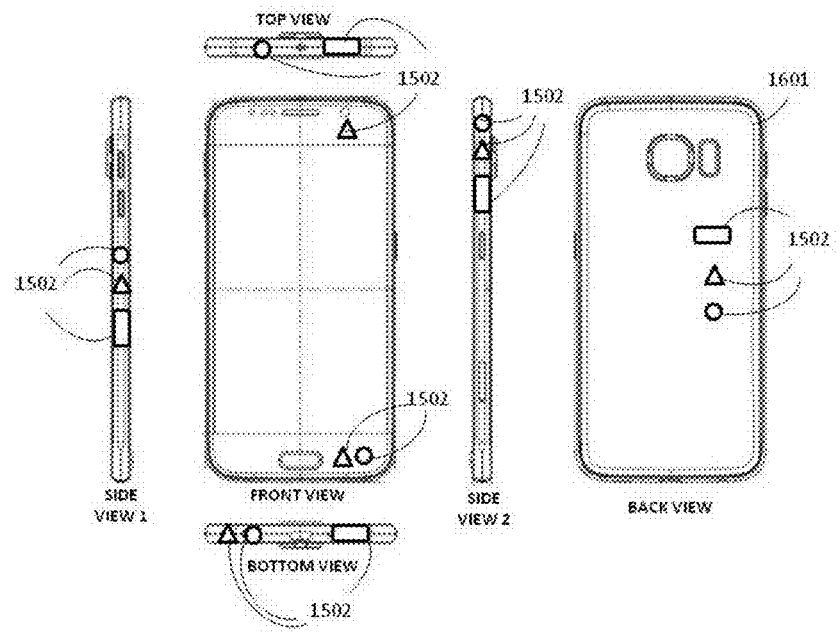
FIG. 16A illustrates an embodiment of personal monitoring device design illustrating that a personal monitoring device may be directly attached to mobile handheld device.

FIG. 16A illustrates an embodiment of the present invention that includes the personal monitoring device 120 and the resident sensors 1502 that may be temporarily and/or permanently attached to the handheld device mobile device 700 like a smartphone. The location of attachment includes front, back, sides, top, bottom, or combinations thereof. The personal monitoring device 120 may use one or more port and/or interface available on the handheld mobile device 700 to communicate and/or interface with the mobile device 700. The personal monitoring device 120 may include its own battery and/or power source, use mobile device 700 to draw power or combinations thereof.

Figure 16B:
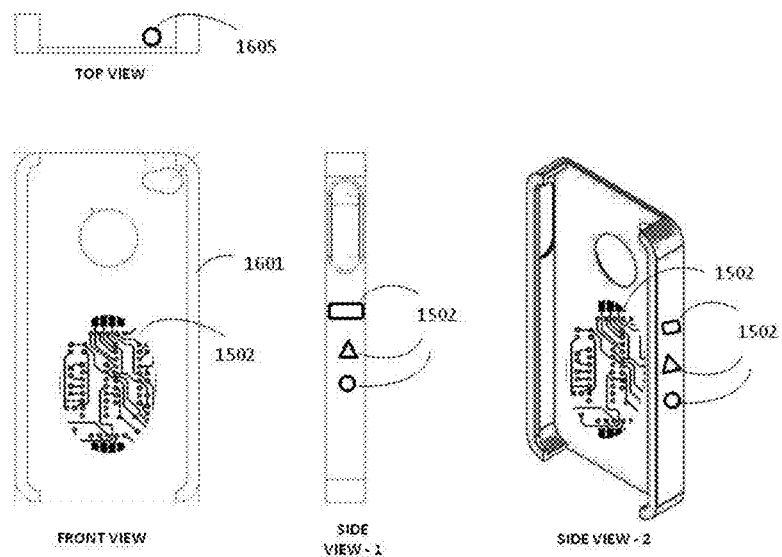
FIG. 16B illustrate an embodiment of personal monitoring device design illustrating that a personal monitoring device may be attached to a mobile phone case and/or indirectly attached to a mobile handheld device.

FIG. 16B illustrate another embodiment of the present invention illustrating that the personal monitoring device 120 may be attached to and/or designed as a case 1601 for the handheld mobile device 700 such as a smartphone. The electrical circuitry 1502 is housed inside the case's design. The personal monitoring device 120 includes interface 1605 that connects with the mobile device 700. The personal monitoring device 120 may include its own battery and/or power source, use mobile device 700 to draw power or combinations thereof.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the Applicant's general inventive concept.

What is claimed:

1. A system for monitoring and classifying driving behavior of an operator of a motor vehicle, comprising:
   (a) at least one mobile device,
      (i) wherein the at least one mobile device is not installed in the motor vehicle being monitored;
      (ii) wherein the mobile device comprises hardware including an accelerometer, a gyroscope, a local memory, and a battery, and further provides functions including a Global Positioning System (GPS) function, a compass function, and a communication function;
      (iii) wherein the hardware of the mobile device further includes at least one information processor resident on the mobile device or available to the mobile device;

(iv) wherein the at least one mobile device is operative to monitor, record, characterize, and communicate information used for classifying driving behavior of the operator; wherein driving data comprising location, speed, acceleration, and braking is solely collected by the mobile device without receiving such driving data from vehicle sensors, calculated or derived based on data solely collected by the mobile device without receiving such data from vehicle sensors, or combinations thereof;

(v) wherein at least a portion of the information collected by the mobile device used for classifying the driving behavior of the operator is collected when the operator is not operating the motor vehicle; wherein the information collected by the mobile device when the operator is not operating the motor vehicle and used for classifying the driving behavior includes location; and (vi) wherein the information collected by the mobile device includes the use of the mobile device as a phone while driving the motor vehicle;

(b) at least one application software resident on the mobile device,
(i) wherein the at least one application software interfaces with the mobile device hardware and functions to gather, record, characterize, and communicate information including the information collected by the mobile device used for classifying the driving behavior of the operator that is collected when the operator is operating the motor vehicle and when the operator is not operating the motor vehicle; and
(ii) wherein the at least one application software is activated and deactivated based on certain predetermined trigger events occurring both when the operator is operating the motor vehicle and when the operator is not operating the motor vehicle;

(c) at least one central control system,
(i) wherein the at least one central control system further includes hardware, software, a database, and a communication function;
(ii) wherein the central control system further includes the information collected from the at least one mobile device used for classifying the driving behavior and further includes additional information about the operator, the motor vehicle, a geography of the motor vehicle, an environment of the motor vehicle, or combinations thereof;
(iii) wherein the central control system further includes at least one information processor resident on the central control system; and
(iv) wherein the at least one central control system is operative to aggregate, characterize, and communicate information about the driving behavior of the operator; and (d) at least one algorithm that is operative to classify and rate the driving behavior of the operator; wherein the classification and rating is based on the information collected by the mobile device, including the information collected by the mobile device when the operator is operating the motor vehicle and when the operator is not operating the motor vehicle.

2. The system of claim 1, further comprising at least one personal monitoring device,
(a) wherein the at least one personal monitoring device is worn by the operator; attached to the operator; is placed in close proximity of the operator; or combinations thereof;

(b) wherein the at least one personal monitoring device comprises hardware including health and fitness sensors, a local memory, and a battery, and further provides functions including a Global Positioning System (GPS) function, a compass function, and a communication function;

(c) wherein the personal monitoring device hardware further includes at least one information processor resident on the personal monitoring device or available to the personal monitoring device;

(d) wherein the personal monitoring device further includes at least one application software resident on the personal monitoring device,
(i) wherein the application software of the personal monitoring devices interfaces with the hardware and functions of the personal monitoring device to gather, record, characterize, and communicate information; and
(ii) wherein the application software is activated and deactivated based on predetermined trigger events;

(e) wherein the personal monitoring device is operative to gather, record, characterize, and communicate information about the driving behavior of the operator: wherein driving data comprises GPS data and accelerometer data;

(f) wherein at least a portion of the information collected by the personal monitoring device used for classifying the driving behavior of the operator is collected when the operator is not operating the motor vehicle; wherein the information collected by the personal monitoring device when the operator is not operating the motor vehicle includes location; and (g) wherein the classification and rating provided by the at least on algorithm is further based on the information collected by the personal monitoring device that is collected when the operator is operating the motor vehicle and when the operator is not operating the motor vehicle.

3. The system of claim 2, wherein the personal monitoring device is a smartwatch; a fitness tracker; a portable medical, health and fitness device; or combinations thereof.

4. The system of claim 1, wherein the mobile device is a smartphone.

5. The system of claim 1, wherein the at least one algorithm further includes:
(a) information relevant to the operator, the motor vehicle, the geography, the environment, or combinations thereof, wherein the information relevant to the operator, the motor vehicle, the geography, and the environment further includes: a vehicle make, a vehicle model, a vehicle model year, a vehicle identification number, a vehicle use, a vehicle passenger capacity, a vehicle cargo capacity, a vehicle location, a vehicle speed, a vehicle direction of motion, a vehicle history, a vehicle distance from specific location, an operator driving history, an operator accident history, an operator traffic violation history, an operator health and fitness, an operator medical condition, an operator body toxicity level, an operator drug and alcohol use, a demographic information, a mobile device usage as a telephone while operating the motor vehicle, a mobile device usage for internet access while operating the motor vehicle, a latitude, a longitude, a speed limit, an elevation, a light condition, a traffic condition, a traffic accident, a presence of construction, a presence of hazardous condition, a type of terrain, an amount of precipitation, a type of precipitation, a weather condition, a season, a presence of other motor vehicle, a presence of other vehicle operator, a date, a time, or combinations thereof; and
(b) wherein the at least one algorithm is operative to classify and provide ratings to the operator.

6. The system of claim 1, wherein the system is operative to provide feedback to a user of the system, and wherein the feedback comprises:
 (a) information about the operator, the vehicle, the geography, the environment, the system, or combinations thereof;
 (b) information about a single user, multiple users, or combinations thereof;
 (c) wherein a format of the feedback is aural, numerical, graphical, tabular, pictorial, or combinations thereof; and
 (d) wherein the feedback is provided through the mobile device, the central control system, devices connected to the mobile device or the central control system, or combinations thereof.

7. The system of claim 1, wherein the system is further operative to use the classification and rating to:
 (a) make an employment and compensation decision;
 (b) determine a qualification for and cost of a travel and entertainment service;
 (c) determine insurability and cost of motor vehicle insurance;
 (d) manage and determine a cost of fleet operation; or
 (e) determine insurability and cost of health insurance.

8. A system for monitoring and classifying driving behavior of an operator of a motor vehicle, comprising:
 (a) at least one mobile device,
  (i) wherein the mobile device is not installed in the motor vehicle being monitored;
  (ii) wherein the mobile device comprises hardware including an accelerometer, a gyroscope, a local memory, and a battery, and further provides functions including a Global Positioning System (GPS) function, a communication function, and a compass function;
  (iii) wherein the hardware of the mobile device further includes at least one information processor resident on the mobile device or available to the mobile device;
  (iv) wherein the at least one mobile device is operative to gather, record, characterize, and communicate information used for classifying driving behavior of the operator, wherein driving data comprising location, speed, acceleration, and braking is collected solely by the mobile device without receiving such driving data from vehicle sensors, calculated or derived based on data solely collected by the mobile device without receiving such data from vehicle sensors, or combinations thereof; and
  (v) wherein at least a portion of the information collected by the mobile device used for classifying the driving behavior of the operator is collected when the operator is not operating the motor vehicle, wherein the information collected by the mobile device when the operator is not operating the motor vehicle includes location; and
  (vi) wherein the information collected by the mobile device includes the use of the mobile device as a phone while driving the motor vehicle;
 (b) at least one personal monitoring device,
  (i) wherein the personal monitoring device is worn by the operator; attached to the operator; is placed in close proximity of the operator; or combinations thereof;
  (ii) wherein the personal monitoring device comprises hardware including health and fitness sensors, a local memory, and a battery, and further provides functions including a Global Positioning System (GPS) function, a compass function, and a communication function;
  (iii) wherein the hardware of the personal monitoring device further includes at least one information processor resident on the personal monitoring device or available to the personal monitoring device; and
  (iv) wherein the at least one personal monitoring device is operative to gather, record, characterize, and communicate information about the driving behavior of the operator; wherein driving behavior comprising location, date and time is solely collected by the personal monitoring device without receiving such driving data from vehicle sensors, calculated or derived based on data solely collected by the personal monitoring device without receiving such data from vehicle sensors, or combinations thereof;
  (v) wherein at least a portion of the information collected by the personal monitoring device and used for classifying the driving behavior of the operator is collected when the operator is not operating the motor vehicle; wherein the information collected by the personal monitoring device and used for classifying driving behavior when the operator is not operating the motor vehicle includes location; and
  (vi) wherein the information collected by the personal monitoring device is in addition to the information collected by the mobile device;
 (c) at least one application software resident on the mobile device and/or the personal monitoring device,
  (i) wherein the application software interfaces with the mobile device and/or the personal monitoring device to gather, record, characterize, and communicate information including the portion of the information collected by the mobile device and/or the personal monitoring device that is collected when the operator is operating the motor vehicle and when the operator is not operating the motor vehicle; and
  (ii) wherein the application software is activated and deactivated based on certain predetermined trigger events;
 (d) at least one central control system,
  (i) wherein the central control system comprises hardware, software, a database, and a communication function;
  (ii) wherein the central control system includes the information collected from the at least one mobile device and at least one personal monitoring device used for classifying the driving behavior of the operator;
  (iii) wherein the central control system further includes at least one information processor resident on the central control system; and
  (iv) wherein the at least one central control system is operative to aggregate, augment, characterize, and communicate information about the driving behavior of the operator based at least on the portion of the information collected by the mobile device and the personal monitoring device that is collected when the operator is operating the motor vehicle and when the operator is not operating the motor vehicle; and (e) wherein the mobile device, the personal monitoring device or combinations thereof are operative to collect information for communicating to the central control system both when the operator is operating the motor vehicle and when the operator is not operating the motor vehicle.

9. The system of claim 8, wherein the mobile device is a smartphone.

10. The system of claim 8, wherein the personal monitoring device is a smartwatch; a fitness tracker; a portable medical, health and fitness device; or combinations thereof.

11. The system of claim 8, further comprising at least one algorithm,
(a) wherein the algorithm includes information relevant to the operator, the motor vehicle, the geography of the motor vehicle, the environment of the operator, or combinations thereof;
(b) wherein the algorithm further includes information relevant to the operator, the motor vehicle, the geography of the motor vehicle, or the environment of the operator, or combinations thereof, in comparison with other operators of motor vehicles, motor vehicles, geographies of motor vehicles, environments of the other operators of motor vehicles, or combinations thereof; and
(c) wherein the algorithm is operative to classify and provide rating to the operator.

12. The system of claim 8, wherein the system is operative to provide feedback to a user of the system, and wherein the feedback comprises:
(a) information about the operator, the motor vehicle, the geography of the motor vehicle, the environment of the operator, the system, or combinations thereof;
(b) information about a single user, multiple users, or combinations thereof;
(c) wherein the feedback format is aural, numerical, graphical, tabular, pictorial, or combinations thereof; and
(d) wherein the feedback is provided through the mobile device, the personal monitoring device, the central control system, devices connected to the mobile device, the personal monitoring device, or the central control system, or combinations thereof.

13. The system of claim 8, wherein the system is further operative to use the classification and rating of the driving behavior of the operator of the motor vehicle to:
(a) make an employment and compensation decision;
(b) determine a qualification for and cost of a travel and entertainment service;
(c) determine insurability and cost of motor vehicle insurance;
(d) manage and determine a cost of a fleet operation; or
(e) determine insurability and cost of health insurance.

14. A method of monitoring and classifying driving behavior of an operator of a motor vehicle, comprising:
(a) gathering, recording, characterizing, and communicating information relevant for classifying driving behavior of the operator through at least one mobile device,
(i) wherein the mobile device is not physically connected to the motor vehicle being monitored;
(ii) wherein the mobile device comprises hardware including an accelerometer, a gyroscope, a local memory, and a battery, and further provides functions including a Global Positioning System (GPS) function, a compass function, and a communication function;
(iii) wherein the hardware of the mobile device further includes at least one information processor resident on the mobile device or available to the mobile device;
(iv) wherein the mobile device further includes at least one application software resident on the mobile device; wherein the application software is activated and deactivated based on certain predetermined trigger events occurring both when the operator is operating the motor vehicle and when the operator is not operating the motor vehicle;
(v) wherein the mobile device is operative to: collect at least driving data comprising location, speed, acceleration, and braking without receiving such driving data from vehicle sensors; calculate or derive at least driving data based on data solely collected by the mobile device without receiving such data from vehicle sensors; or combinations thereof;
(vi) wherein the mobile device is operative to collect at least a portion of information used for classifying the driving behavior of the operator when the operator is not operating the motor vehicle, wherein the information collected by the mobile device when the operator is not operating the motor vehicle and used for classifying the driving behavior includes location; and
(vii) wherein the mobile device is operative to collect data comprising the use of the mobile device as a phone while driving the motor vehicle;
(b) transmitting the information from the mobile device to at least one central control system that includes additional hardware, software, a database, and a communication function;
(i) wherein the central control system includes additional information about the operator, the motor vehicle, the geography of the motor vehicle, the environment of the motor vehicle, or combinations thereof;
(ii) wherein the central control system is operative to aggregate data collected from the mobile device;
(iii) wherein the additional hardware, software, database, and communication function included in the central control system are operative to gather, record, characterize, and communicate information about the driving behavior of the motor vehicle operator; and
(iv) wherein the central control system includes at least one information processor resident on the central control system; and
(c) processing the information through at least one algorithm that is operative to classify and rate the driving behavior of the operator, wherein the classification and rating is based on at least the information collected by the mobile device when the operator is operating the motor vehicle and when the operator is not operating the motor vehicle.

15. The method of claim 14, wherein the system further comprises at least one personal monitoring device,
(a) wherein the personal monitoring device is worn by the operator of the motor vehicle; attached to the operator of the motor vehicle; is placed in close proximity of the operator of the motor vehicle; or combinations thereof;
(b) wherein the personal monitoring device comprises hardware including health and fitness sensors, a local memory, and a battery; and further provides functions including a Global Positioning System (GPS) function and a communication function;
(c) wherein the personal monitoring device further includes at least one information processor resident on the personal monitoring device or available to the personal monitoring device;
(d) wherein the personal monitoring device further includes at least one application software resident on the personal monitoring device,
  (i) wherein the application software interfaces with the personal monitoring device hardware and the personal monitoring device functions to gather, record, characterize, and communicate information; and
  (ii) wherein the application software is activated and deactivated based on predetermined trigger events;
(e) wherein the personal monitoring device is operative to gather, record, characterize, and communicate information at least about the driving behavior of the operator; wherein the driving behavior information about the operator comprises location, date and time;
(f) wherein the persona monitoring device collects at least a portion of the information used for classifying the driving behavior of the operator when the operator is not operating the motor vehicle, wherein the information collected by the personal monitoring device when the operator is not operating the motor vehicle includes location; and
(g) wherein the classification and rating provided by the at least on algorithm is further based on at least a portion of the information collected by the personal monitoring device when the operator is operating the motor vehicle and when the operator is not operating the motor vehicle.

16. The method of claim 15, wherein the personal monitoring device is a smartwatch; a fitness tracker; a portable medical, health and fitness device; or combinations thereof.

17. The method of claim 14, wherein the mobile device is a smartphone.

18. The method of claim 14, wherein the least one algorithm further includes:
(a) information relevant to the operator, the motor vehicle, the geography of the motor vehicle, the environment of the motor vehicle, or combinations thereof, wherein the information relevant to the operator, the motor vehicle, the geography of the motor vehicle, the environment of the motor vehicle, or combinations thereof further includes: a vehicle make, a vehicle model, a vehicle model year, a vehicle identification number, a vehicle use, a vehicle passenger capacity, a vehicle cargo capacity, a vehicle location, a vehicle speed, a vehicle direction of motion, a vehicle history, a vehicle distance from specific location, an operator driving history, an operator accident history, an operator traffic violation history, an operator health and fitness, an operator body toxicity level, an operator drug and alcohol use, demographic information, a mobile device usage as a telephone while operating the motor vehicle, a mobile device usage for internet access while operating the motor vehicle, a latitude, a longitude, a speed limit, an elevation, a light condition, a traffic condition, a traffic accident, a presence of construction, a presence of hazardous condition, a type of terrain, an amount of precipitation, a type of precipitation, a weather condition, a season, a presence of other motor vehicles, a presence of other operators of motor vehicles, a date, a time, or combinations thereof;
(b) comparison of information relevant to the operator, the motor vehicle, the geography of the motor vehicle, or the environment of the motor vehicle, or combinations thereof to other operators of motor vehicles, other motor vehicles, other geographies of the motor vehicles, other environments of motor vehicles, or combinations thereof; and
(c) wherein the algorithm is operative to classify and provide ratings to the operator.

19. The method of claim 14, further provides feedback to a user of the system, and wherein the feedback comprises:
(a) information about a plurality of operators, a plurality of motor vehicles, a plurality of geographies of motor vehicles, a plurality of environments of motor vehicles, or combinations thereof;
(b) wherein a format of the feedback is aural, numerical, graphical, tabular, pictorial, or combinations thereof; and
(c) wherein the feedback is provided through the mobile device, the central control system, one or more devices connected to the mobile device or the central control system, or combinations thereof.

20. The method of claim 14, wherein the method further comprises using the classification and rating of the driving behavior of the operator of the motor vehicle to:
(a) make employment and compensation decision;
(b) determine a qualification for and cost of a travel and entertainment service;
(c) determine insurability and cost of motor vehicle insurance;
(d) manage and determining a cost of a fleet operation; or
(e) determine insurability and cost of health insurance.

* * * * *